United States Patent
Jang et al.

(10) Patent No.: US 10,750,086 B2
(45) Date of Patent: Aug. 18, 2020

(54) MOBILE TERMINAL AND OPERATING METHOD THEREOF

(71) Applicant: LG ELECTRONICS INC., Seoul (KR)

(72) Inventors: Yujune Jang, Seoul (KR); Seongeun Kim, Seoul (KR); Bongjeong Jeon, Seoul (KR); Jie Seol, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 271 days.

(21) Appl. No.: 15/783,877

(22) Filed: Oct. 13, 2017

(65) Prior Publication Data
US 2018/0109729 A1    Apr. 19, 2018

(30) Foreign Application Priority Data

Oct. 18, 2016 (KR) .................. 10-2016-0135371

(51) Int. Cl.
*H04N 5/232* (2006.01)
*H04N 13/366* (2018.01)
*G06T 7/20* (2017.01)

(52) U.S. Cl.
CPC .......... *H04N 5/23238* (2013.01); *G06T 7/20* (2013.01); *H04N 5/23203* (2013.01); *H04N 5/23206* (2013.01); *H04N 5/23216* (2013.01); *H04N 5/23293* (2013.01); *H04N 13/366* (2018.05); *G06T 2207/10016* (2013.01)

(58) Field of Classification Search
USPC ....................................................... 348/36
See application file for complete search history.

(56) References Cited

U.S. PATENT DOCUMENTS

| 9,313,409 | B2 | 4/2016 | Kim et al. | |
|---|---|---|---|---|
| 2007/0002131 | A1 | 1/2007 | Ritchey | |
| 2010/0002070 | A1* | 1/2010 | Ahiska | G08B 13/19691 |
| | | | | 348/36 |
| 2013/0002809 | A1* | 1/2013 | Shimizu | G06T 3/0062 |
| | | | | 348/38 |

(Continued)

FOREIGN PATENT DOCUMENTS

CN          104639735          5/2015

OTHER PUBLICATIONS

European Patent Office Application Serial No. 17001622.4, Partial Search Report dated Mar. 14, 2018, 13 pages.

*Primary Examiner* — William C Vaughn, Jr.
*Assistant Examiner* — Naod W Belai
(74) *Attorney, Agent, or Firm* — Lee, Hong, Degerman, Kang & Waimey

(57) ABSTRACT

Disclosed herein are a mobile terminal and an operating method thereof. The mobile terminal includes a short-range communication module configured to perform short-range communication with an omnidirectional capture device for capturing an omnidirectional image, a display unit configured to display the omnidirectional image received through the short-range communication module and to receive user input, and a controller configured to set an area, in which a moving image is generated, in the omnidirectional image and to generate the moving image in the set area. Therefore, it is possible to acquire the moving image of the moving object in the omnidirectional image.

20 Claims, 39 Drawing Sheets

(56) References Cited

U.S. PATENT DOCUMENTS

| | | | |
|---|---|---|---|
| 2013/0293672 A1* | 11/2013 | Suzuki | H04N 5/23238 |
| | | | 348/36 |
| 2014/0098996 A1 | 4/2014 | Fujimatsu et al. | |
| 2015/0091939 A1 | 4/2015 | Suzuki et al. | |
| 2015/0124125 A1 | 5/2015 | Kim et al. | |
| 2016/0286123 A1 | 9/2016 | Hwang et al. | |
| 2017/0127008 A1* | 5/2017 | Kankaanpaa | G06K 9/00711 |

* cited by examiner

FIG. 5
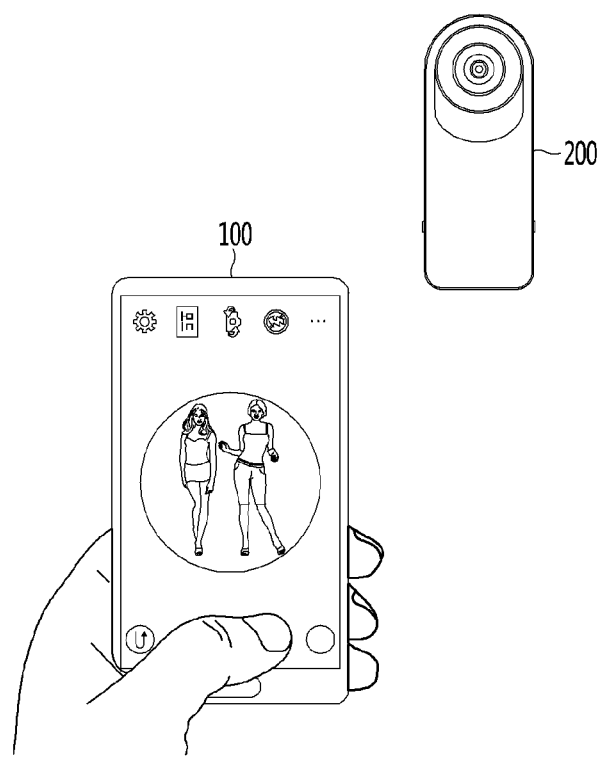

FIG. 8A
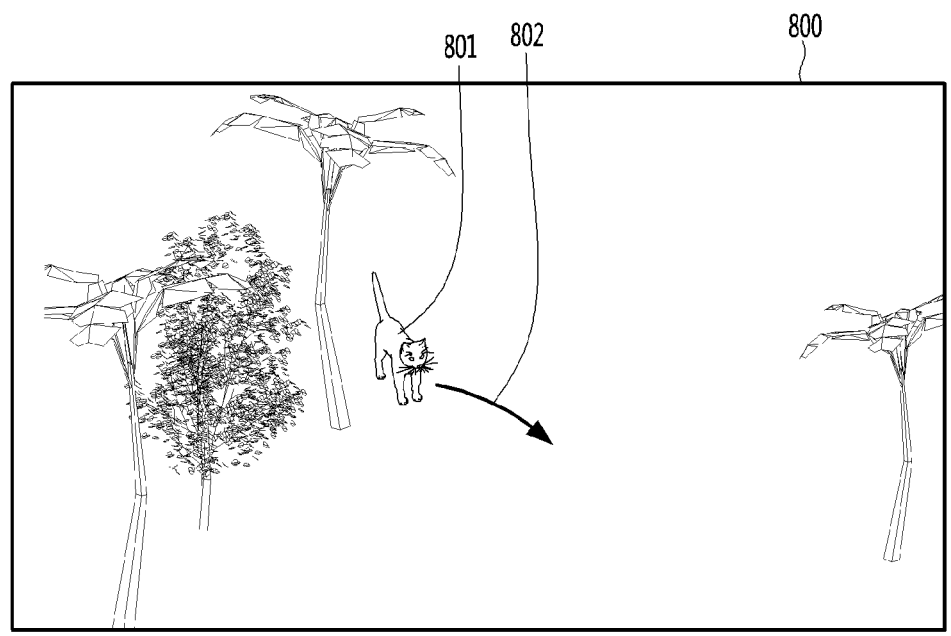
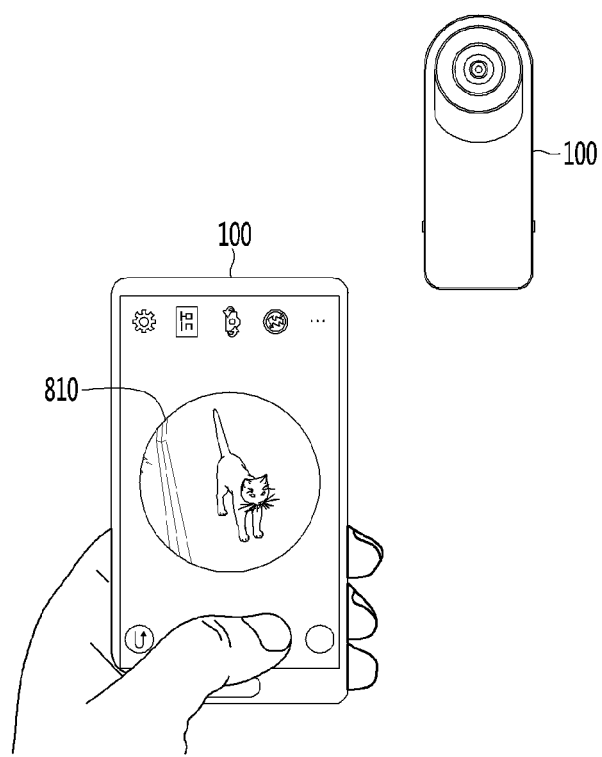

FIG. 8D
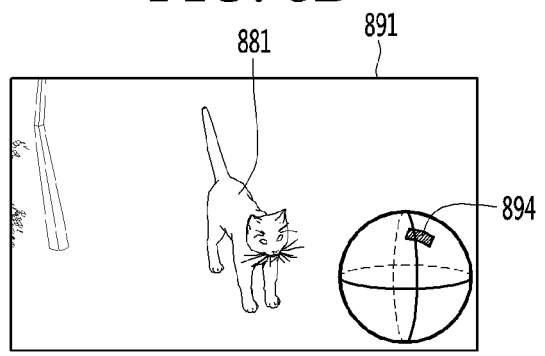
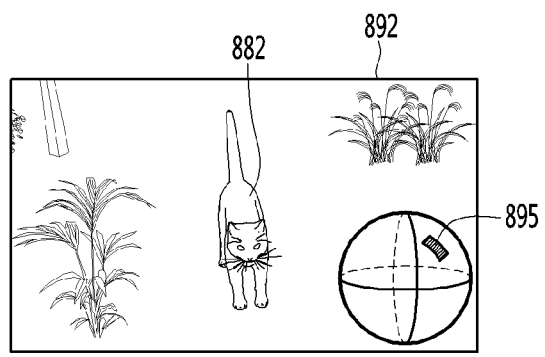
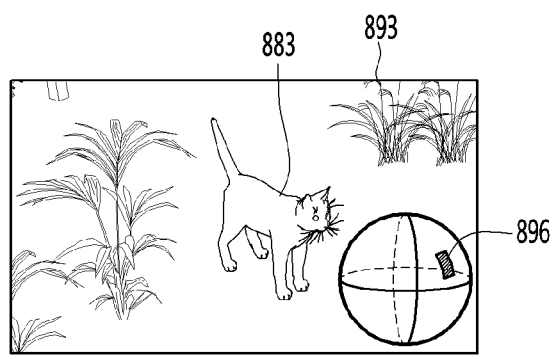

MOBILE TERMINAL AND OPERATING METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2016-0135371, filed on Oct. 18, 2016, the contents of which are all hereby incorporated by reference herein in its entirety.

BACKGROUND

The present invention relates to a mobile terminal and an operating method thereof and, more particularly, to a mobile terminal capable of generating a moving image based on an omnidirectional image, and an operating method thereof.

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

Recently, mobile terminals may interwork with a capture device for capturing an omnidirectional image. While a general camera captures a two-dimensional (2D) image, a 360-degree camera may capture a spherical omnidirectional image of a three-dimensional space. The captured omnidirectional image may be transmitted to the mobile terminal and displayed on a display.

An existing 360-degree camera may capture an omnidirectional background without movement, but cannot designate an area to be captured. That is, an angle of view of the 360-degree camera cannot be set and thus a user cannot capture only a desired area.

In addition, since the omnidirectional image has a wide capture range, a large storage space is required to store the omnidirectional image.

Accordingly, there is a need for generating a moving image having capacity less than that of a video using an omnidirectional image.

SUMMARY

Accordingly, an object of the present invention is to address the above-noted and other problems.

An object of the present invention is to provide a mobile terminal capable of setting a capture area of a capture device, setting an area, in which a moving image is generated, in an omnidirectional image, and generating the moving image in the set area, and an operating method thereof.

Another object of the present invention is to set one or more capture areas of an omnidirectional capture device through a mobile terminal.

A mobile terminal according to one embodiment of the present invention includes a short-range communication module configured to perform short-range communication with an omnidirectional capture device for capturing an omnidirectional image, a display unit configured to display the omnidirectional image received through the short-range communication module and to receive user input, and a controller configured to set an area, in which a moving image is generated, in the omnidirectional image and to generate the moving image in the set area.

A method of operating a mobile terminal according to another embodiment includes performing short-range communication with an omnidirectional capture device for capturing an omnidirectional image and receiving the omnidirectional image, displaying the received omnidirectional image, setting an area, in which a moving image is generated, in the omnidirectional image and generating the moving image in the set area.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 5 is a diagram illustrating a method of operating a mobile terminal and an omnidirectional capture device according to an embodiment of the present invention;

FIGS. 8a to 8d are diagrams illustrating an example of automatically tracking a moving object and generating a moving image according to an embodiment of the present invention;

DETAILED DESCRIPTION OF THE PREFERRED EMBODIMENT

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
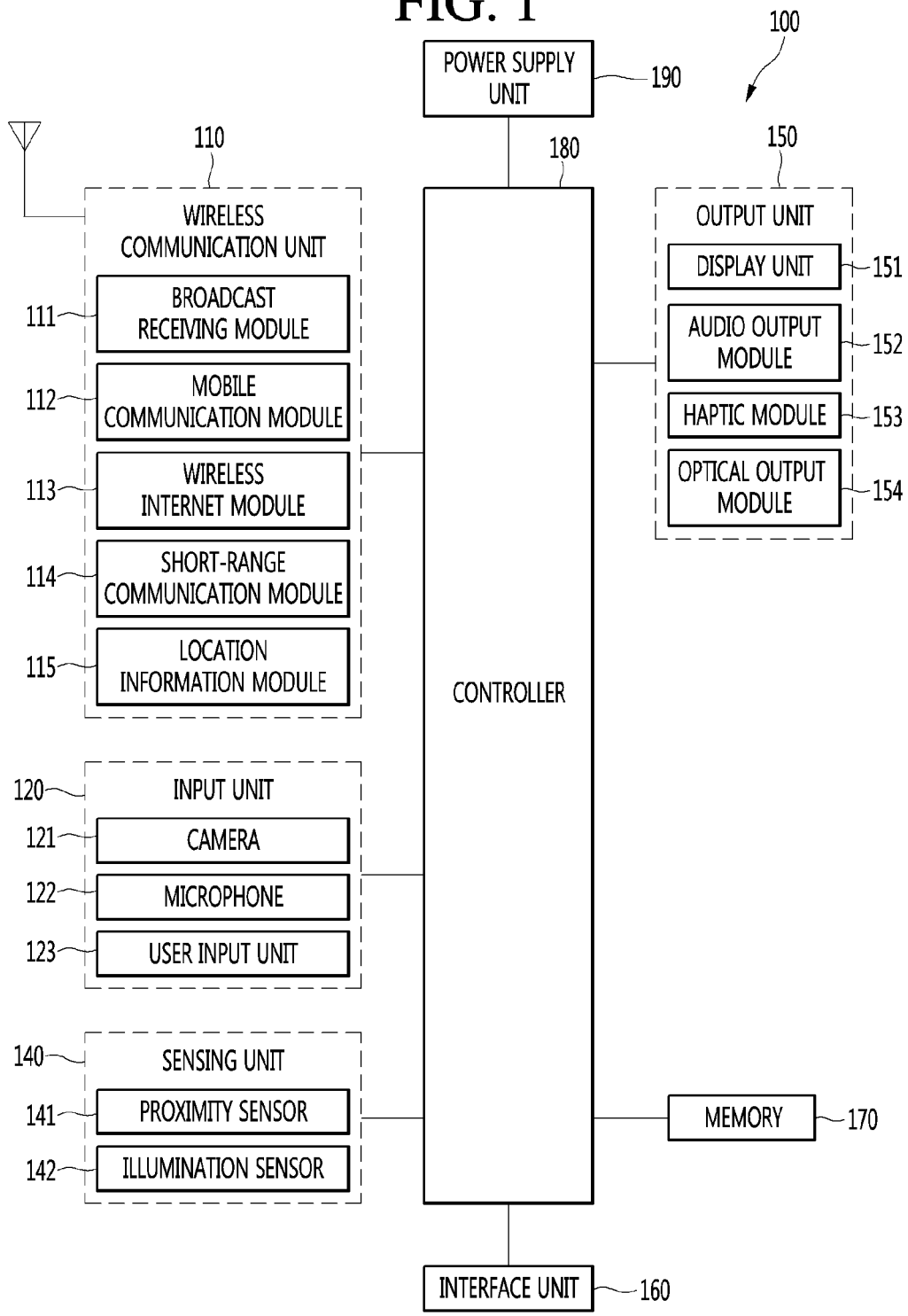
FIG. 1 is a block diagram of a mobile terminal in accordance with the present disclosure.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be a server which generates and transmits a broadcast signal and/or broadcast associated information, or a server which receives a pre-generated broadcast signal and/or broadcast associated information, and sends such items to the mobile terminal.

The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), UltraWideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

Figure 2:
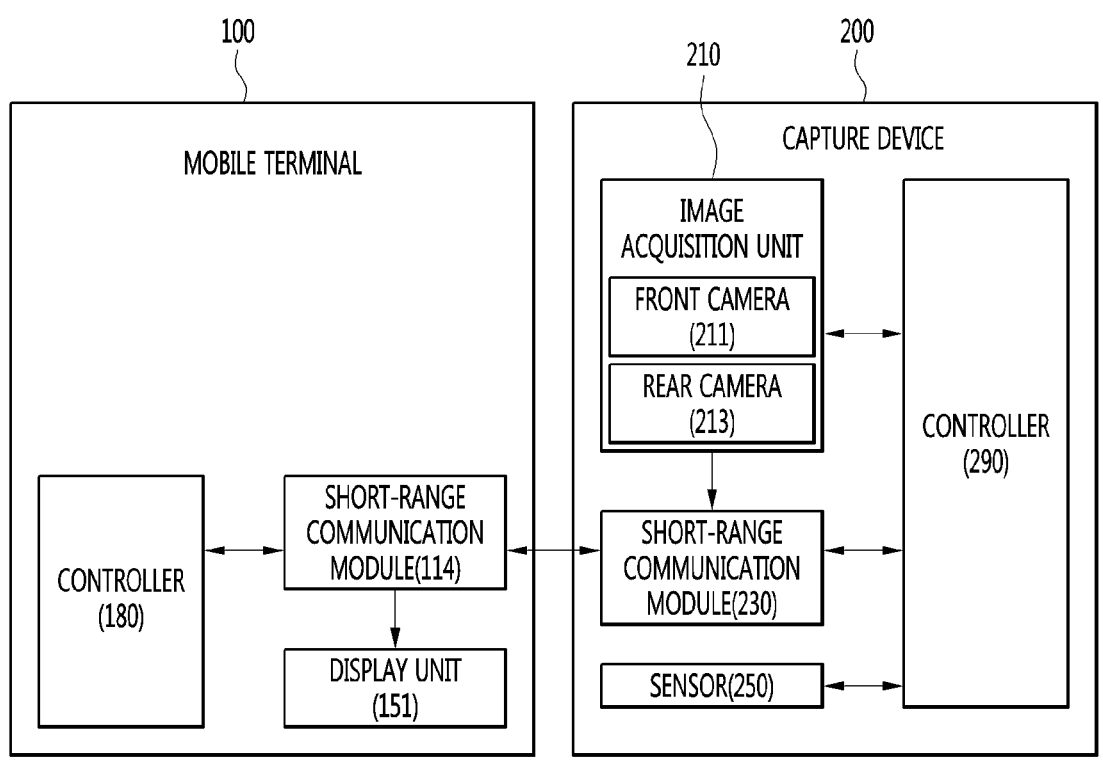
FIG. 2 is a diagram illustrating the configuration of a mobile terminal and an omnidirectional capture device according to an embodiment of the present invention.

FIG. 2 is a diagram illustrating the configuration of a mobile terminal and an omnidirectional capture device according to an embodiment of the present invention.

In FIG. 2, only some of the components of the mobile terminal 100 shown in FIG. 1 are shown. For the configuration of the mobile terminal 100 shown in FIG. 2, refer to FIG. 1.

The omnidirectional capture device 200 may include an image acquisition unit 210, a short-range communication module 230, a sensor 250 and a controller 290.

The image acquisition unit 210 may capture an omnidirectional background around the omnidirectional capture device 200 and acquire an omnidirectional image.

The omnidirectional image may be obtained by capturing all directions from a specific point.

For example, if there is a virtual sphere and a specific point is the center of the virtual sphere, all directions may refer to all directions from the center of the sphere to a surface of the virtual sphere.

That is, when an image is captured using an omnidirectional capture device 200, such as a 360-degree camera, an omnidirectional image may be obtained by capturing all directions of the omnidirectional capture device 200.

Figure 3:
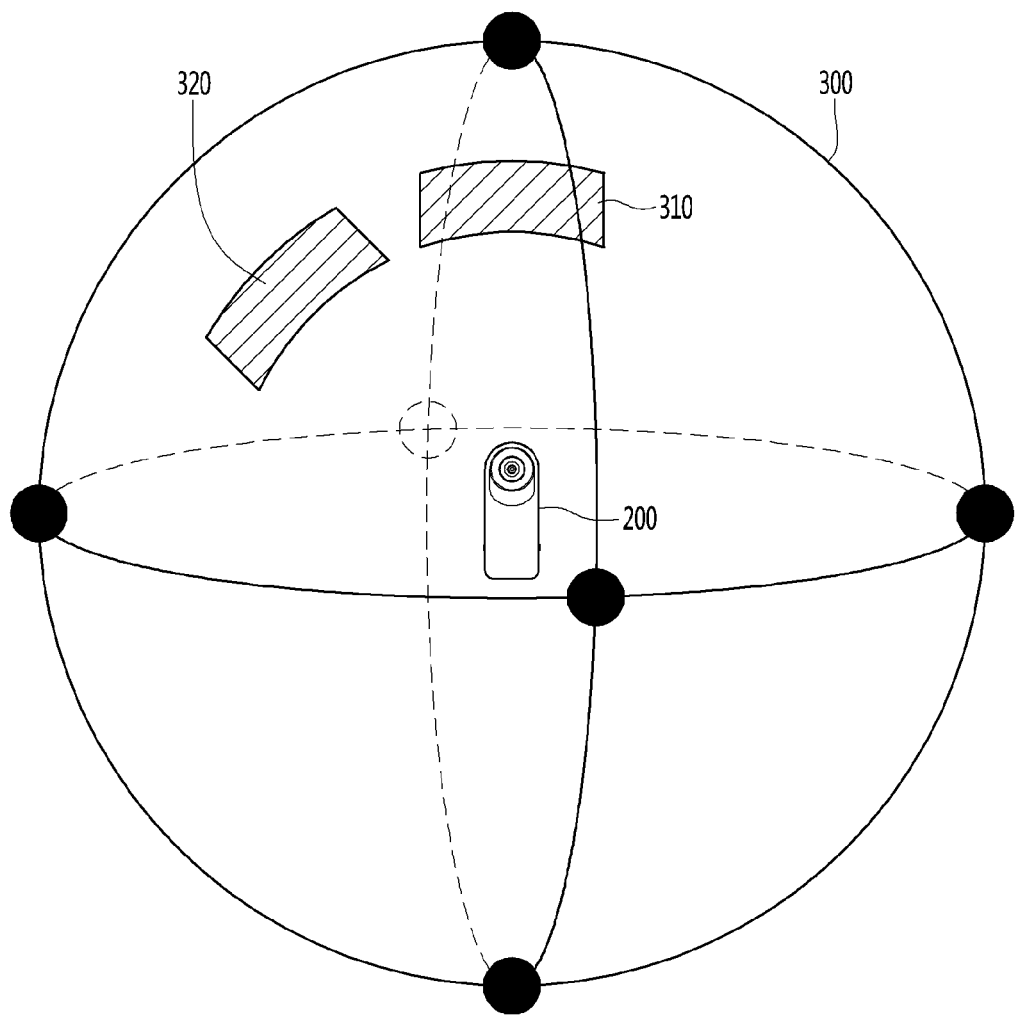
FIG. 3 is a diagram illustrating a state in which an omnidirectional background around an omnidirectional capture device is captured.

The omnidirectional image may have a spherical shape as shown in FIG. 3. The omnidirectional image may be referred to as a 360-degree image.

The image acquisition unit 210 may include a plurality of cameras. Although a front camera 211 and a rear camera 213 are shown in FIG. 2, the present invention is not limited thereto and three or more cameras may be included in the omnidirectional capture device 200.

Each of the front camera 211 and the rear camera 213 may include a fisheye lens having an angle of view of 180 degrees or more. Each of the front camera 211 and the rear camera 213 may capture an omnidirectional background through the fisheye lens.

The controller 290 may synthesize two partial omnidirectional images acquired through the fisheye lens in a spherical shape to generate an omnidirectional image.

Although the omnidirectional image has a spherical shape in the above description, the present invention is not limited thereto.

More specifically, when an image within a specific angle of view is captured using the omnidirectional capture device 200, the omnidirectional image may mean an image obtained by capturing all directions within the specific angle of view.

For example, when the angle of view of the omnidirectional capture device 200 is set to 180 degrees, the omnidirectional image may be an image obtained by capturing all directions from the center of the virtual sphere to the surface of a virtual hemisphere.

The short-range communication module 230 may wirelessly transmit the spherical omnidirectional image generated by the controller 290 to the mobile terminal 100. The short-range communication module 230 may transmit the omnidirectional image to the mobile terminal 100 using any one of communication protocols such as Wi-Fi Direct, Bluetooth or Wi-Fi, without being limited thereto.

The omnidirectional capture device 200 may include a wired communication interface such as a USB interface in addition to the short-range communication module 230 and may communicate with the mobile terminal 100 through the wired communication interface.

The sensor 250 may include one or more of a gyroscope sensor and an acceleration sensor.

The controller 290 may control overall operation of the omnidirectional capture device 200.

In addition, the omnidirectional capture device 200 may include one or more microphones.

FIG. 3 is a diagram illustrating a state in which an omnidirectional background around an omnidirectional capture device is captured.

The capture device 200 may capture the omnidirectional background. The capture device 200 may capture a vertical lower area and a vertical upper area based on a horizontal plane, on which the capture device 200 is located. That is, the capture device 200 may acquire the spherical omnidirectional image 300 corresponding to the omnidirectional background of the capture device 200. The acquired omnidirectional image 300 may be transmitted to the mobile terminal 100.

The display unit 151 of the mobile terminal 100 may display a partial image corresponding to a specific area of the omnidirectional image 300. For example, the display unit 151 of the mobile terminal 100 may display a first partial image 310 corresponding to a first area or a second partial image 320 corresponding to a second area of the omnidirectional image 300.

The partial image displayed on the display unit 151 may be changed according to user settings and may be set to a default partial image.

Figure 4:
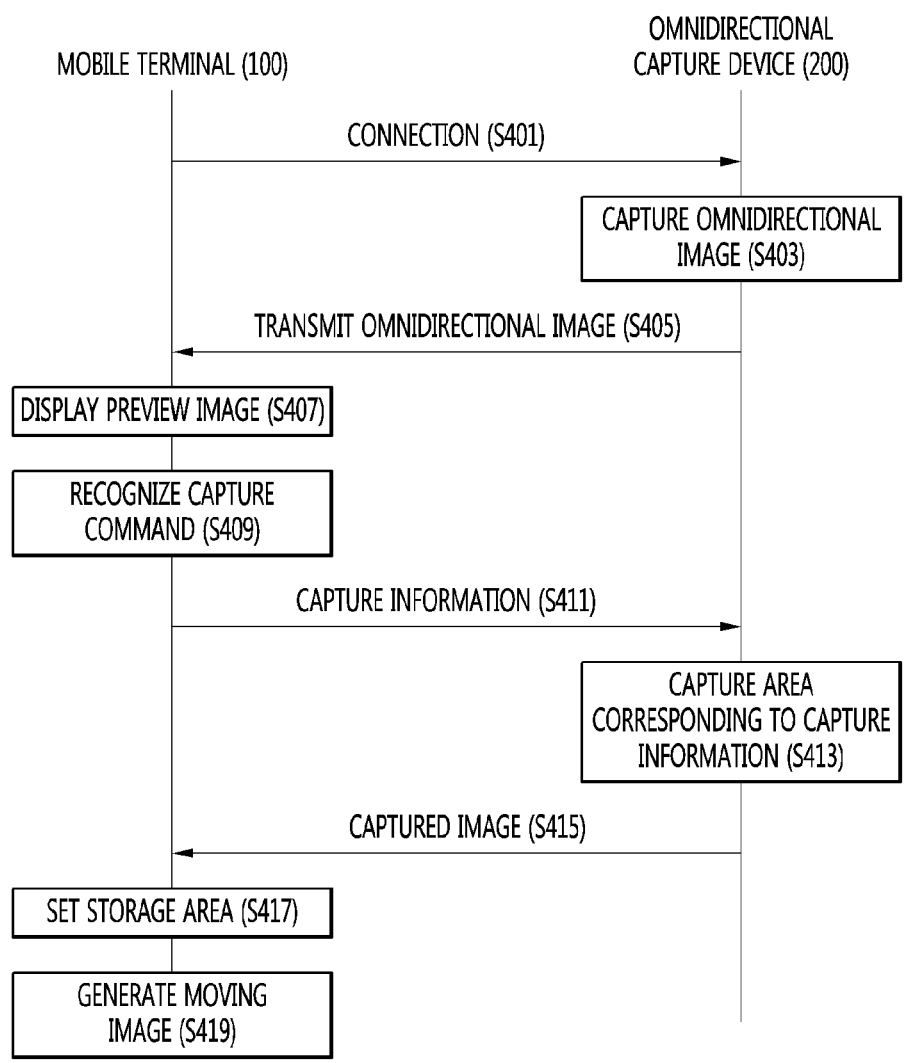
FIG. 4 is a ladder diagram illustrating a method of operating a mobile terminal and an omnidirectional capture device according to an embodiment of the present invention.

FIG. 4 is a ladder diagram illustrating a method of operating a mobile terminal and an omnidirectional capture device according to an embodiment of the present invention.

First, the mobile terminal 100 and the omnidirectional capture device 200 are connected to each other through short-range wireless communication (S401).

The omnidirectional capture device 200 captures the omnidirectional image through the image acquisition unit 210 (S403) and transmits the acquired omnidirectional image to the mobile terminal 100 (S405).

In one embodiment, the controller 290 of the omnidirectional capture device 200 may transmit the omnidirectional image to the short-range communication module 114 of the mobile terminal 100 through the short-range communication module 230.

In one embodiment, the controller 290 of the omnidirectional capture device 200 may transmit the acquired omnidirectional image to the mobile terminal 100 in real time.

The controller 180 of the mobile terminal 100 displays the omnidirectional image on the display unit 151 of the mobile terminal 100 (S407).

The controller of the mobile terminal 100 displays the omnidirectional image received from the omnidirectional capture device 200 on the display unit 151. The omnidirectional image may be displayed on the display unit 151 using various methods.

The controller 180 of the mobile terminal 100 may display a predetermined area of the omnidirectional image on a screen without distortion. In this case, the angle of view of the image displayed on the display unit 151 may be restricted. If the angle of view increases, the image displayed on the display unit 151 may be distorted.

In addition, the controller 180 of the mobile terminal 100 may display the full omnidirectional image on the display unit 151. In this case, the image may be distorted, but the full distorted omnidirectional image may be displayed on the display unit 151.

That is, the controller of the mobile terminal 100 may provide the omnidirectional image received from the omnidirectional capture device 200 on the display unit 151 in the form of a preview.

When a moving image is generated using a pre-captured omnidirectional image, a step of displaying a preview image may be replaced with a step of displaying a pre-stored omnidirectional image.

The controller 180 of the mobile terminal 100 may recognize a capture command and generate capture information of a moving image (S409). The capture information may be delivered to the omnidirectional capture device 200 (S411). The omnidirectional capture device 200 may capture the omnidirectional image according to the capture information (S413). In addition, the omnidirectional capture device 200 may transmit the captured omnidirectional image to the mobile terminal (S415).

In the present invention, the capture information may include a capture area, in which a moving image is generated, of the omnidirectional image, a capture time, the number of frames captured per unit time, etc. When a moving image is generated using a pre-stored omnidirectional image, the capture information may include a capture area, in which a moving image is generated, of the omnidirectional image, a capture time, the number of frames captured per unit time, etc.

In one embodiment, the capture information may be information for designating a capture area of an omnidirectional image to be captured by the omnidirectional capture device 200 based on the position of the omnidirectional capture device 200. More specifically, the capture information may be information for capturing an omnidirectional image based on a certain object of the omnidirectional image.

In the present invention, setting the capture area of the omnidirectional capture device 200 may be interpreted as having the same meaning as setting an angle of view of the omnidirectional capture device 200.

Specifically, setting the capture area of the omnidirectional capture device 200 may be interpreted as having the same meaning as setting an angle of view of a front camera 211 or a rear camera 213 of the omnidirectional capture device 200.

If a user generates a moving image through the omnidirectional capture device 200, it is difficult to find a desired part while viewing the omnidirectional image through the display unit 151 of the mobile terminal 100.

At this time, if the user designates a predetermined area of a moving object as a capture area in the controller 180 of the mobile terminal 180, even when a user does not recognize a moving area of the omnidirectional image, the controller 180 of the mobile terminal 100 may generate capture information including the capture area.

In one embodiment, the controller 180 of the mobile terminal 100 may not store an image corresponding to an area other than the designated capture area of the omnidirectional image received from the omnidirectional capture device 100 according to a capture designation request.

Accordingly, according to one embodiment of the present invention, it is possible to solve a problem that it is difficult to store an omnidirectional image captured through the omnidirectional capture device 200 in the memory 170 due to a large capacity thereof.

In another embodiment of the present invention, the omnidirectional capture device 200 may capture and transmit the omnidirectional image including images of all directions to the mobile terminal 100 and the controller 180 of the mobile terminal 100 may set a predetermined area in the received omnidirectional image and generate a moving image in the set area.

In another embodiment, the controller 180 of the mobile terminal 100 may receive only a captured image corresponding to the set capture area from the omnidirectional capture device 200. To this end, the omnidirectional capture device 200 may transmit only a partial image corresponding to the set capture area of the omnidirectional image to the mobile terminal 100.

In another embodiment, the controller 180 of the mobile terminal 100 may receive only a captured image corresponding to a set capture time from the omnidirectional capture device 200. For example, if there is no moving object, capture of the omnidirectional capture device 200 may be restricted.

In another embodiment, the controller 180 of the mobile terminal 100 may receive only a captured image corresponding to the set number of frames captured per unit time from the omnidirectional capture device 200. For example, if the number of frames captured per unit time is set to 2, the omnidirectional capture device 200 may transmit to the captured image to the mobile terminal 100, at a frame rate of 2 frames per second, which is less than a general frame rate of 15 to 60 frames per second.

The controller 180 of the mobile terminal 100 may set a storage area in a capture area (S417). In addition, the controller 180 of the mobile terminal 100 may generate a moving image (S419).

In one embodiment, the controller 180 of the mobile terminal 100 may set a storage area of the captured omnidirectional image and generate a moving image corresponding to the set area.

In the present invention, the moving image may be an image capable of implementing a simple animation effect by storing a plurality of images as a single file in a graphics interchange format (GIF).

Hereinafter, the embodiment of FIG. 4 will be described in detail.

FIG. 5 is a diagram illustrating a method of operating a mobile terminal and an omnidirectional capture device according to an embodiment of the present invention.

In FIG. 5, assume that the mobile terminal 100 and the omnidirectional capture device 200 are connected to each other through short-range wireless communication.

In addition, assume that the omnidirectional capture device 200 captures the omnidirectional image 510 around the omnidirectional capture device 200.

Although the omnidirectional image 510 includes only persons located at one side in FIG. 5, only a portion of the omnidirectional image is displayed and the omnidirectional image 510 may be a full image around the omnidirectional capture device 200.

Referring to FIG. 5, the mobile terminal 100 may display a partial image of the omnidirectional image 510 captured by the omnidirectional capture device 200.

In FIG. 5, the mobile terminal 100 may receive the omnidirectional image corresponding to the omnidirectional image 510 from the omnidirectional capture device 200 but may not display the received omnidirectional image on the display unit 151.

The image displayed on the display unit 151 of the mobile terminal 100 may correspond to the omnidirectional image captured by the omnidirectional device 200. The omnidirectional image may have a two-dimensionally spread shape instead of a spherical shape.

The mobile terminal 100 may receive a spherical omnidirectional image from the omnidirectional capture device 200 and convert the spherical omnidirectional image into a two-dimensional image.

The mobile terminal 100 may divide the two-dimensional omnidirectional image 550 into a plurality of grid areas. A grid area corresponding to the set capture area among the plurality of grid areas may be displayed to be distinguished from the other grid areas.

Figure 6A:
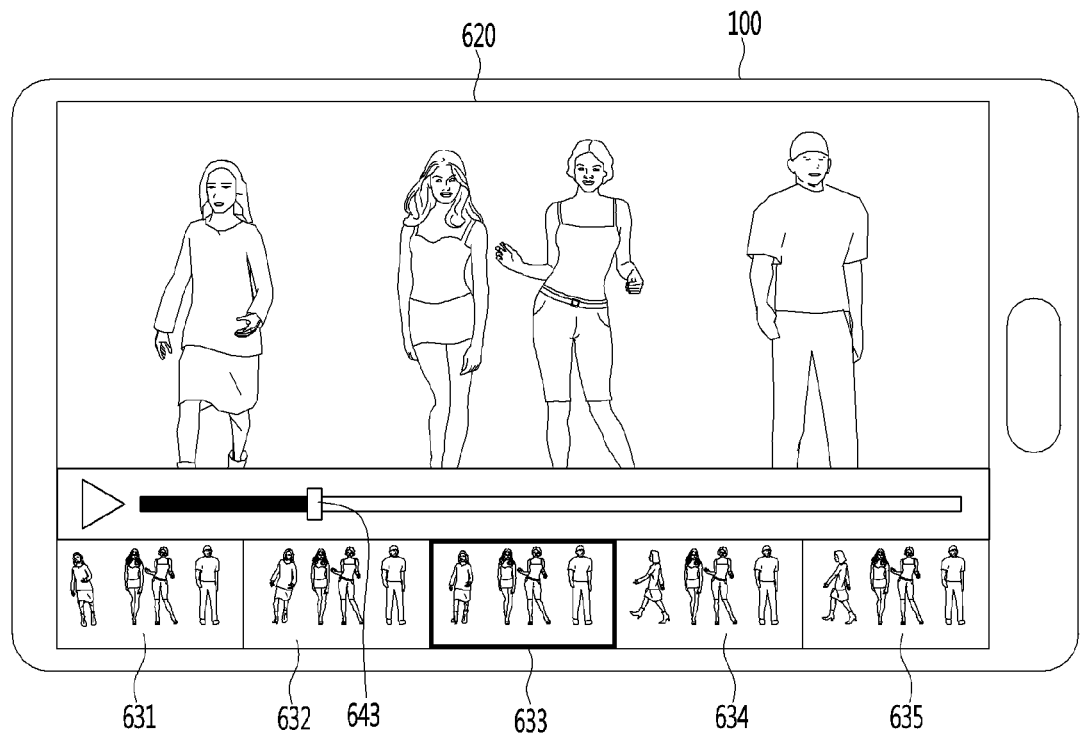
FIGS. 6a to 6c are diagrams illustrating an example of recognizing a moving person in an omnidirectional image and automatically generating a moving image according to an embodiment of the present invention.
Figure 6B:
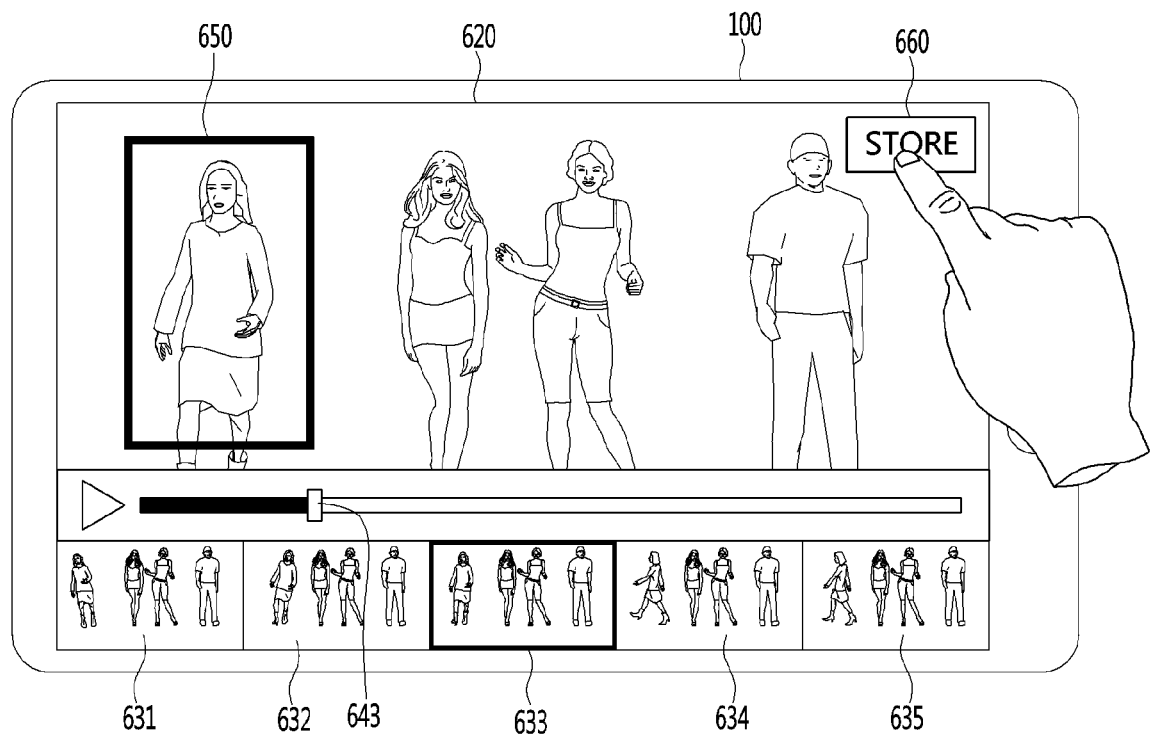
Figure 6C:
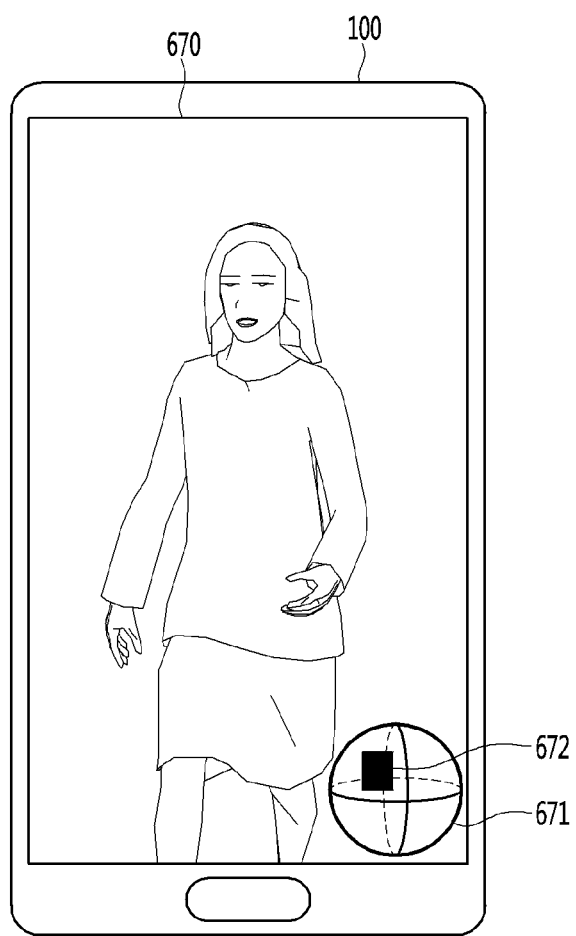

FIGS. 6a to 6c are diagrams illustrating an example of recognizing a moving person in an omnidirectional image and automatically generating a moving image according to an embodiment of the present invention.

Referring to FIG. 6a, the controller 180 of the mobile terminal 100 may display a partial image 620 of the omnidirectional image on the display unit 151. In addition, the controller 180 of the mobile terminal 100 may display timeline images 631 to 635 corresponding to the partial image 620 of the omnidirectional image at the lower end of the display unit 151. In addition, the controller 180 of the mobile terminal 100 may display a point of time when the image is displayed on the display unit 151. In FIG. 6a, the partial image 620 of the omnidirectional image may be an image corresponding to the point of time 643 and a timeline image 633 may also be an image corresponding to a point of time 643.

Referring to FIG. 6b, in one embodiment of the present invention, the controller 180 of the mobile terminal 100 may search the omnidirectional image for an area 650 in which an object moves. The searched area may be displayed on the display unit 151 of the mobile terminal 100. When the searched area is designated, a user may select an icon 660 for storing the area and generate a moving image corresponding to the area.

Referring to FIG. 6c, in one embodiment of the present invention, the controller 180 of the mobile terminal 100 may generate a moving image 670 corresponding to the area 650 in which the object moves. In addition, the controller may display an area 672 corresponding to the moving image 670 in a sphere 671 corresponding to the omnidirectional image.

According to the present invention, when the user of the mobile terminal 100 generates a moving image using the omnidirectional image, the controller 180 of the mobile terminal 100 may automatically detect the moving image from the omnidirectional image and generate a moving image. Accordingly, in the present invention, it is possible to more easily detect a moving object from an omnidirectional image, from which it is difficult to detect a desired object, and to generate a moving image.

Figure 7A:
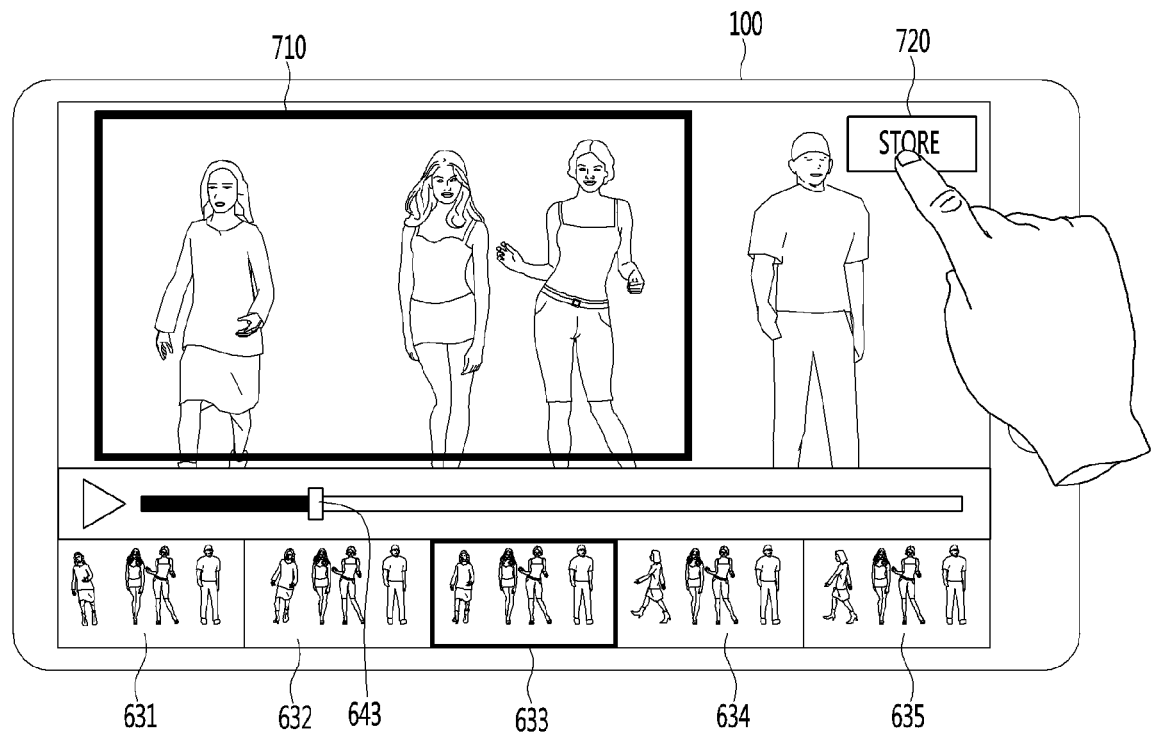
FIGS. 7a to 7e are diagrams illustrating an example of recognizing a moving person in an omnidirectional image and generating a moving image in an area including the moving person according to an embodiment of the present invention.
Figure 7B:
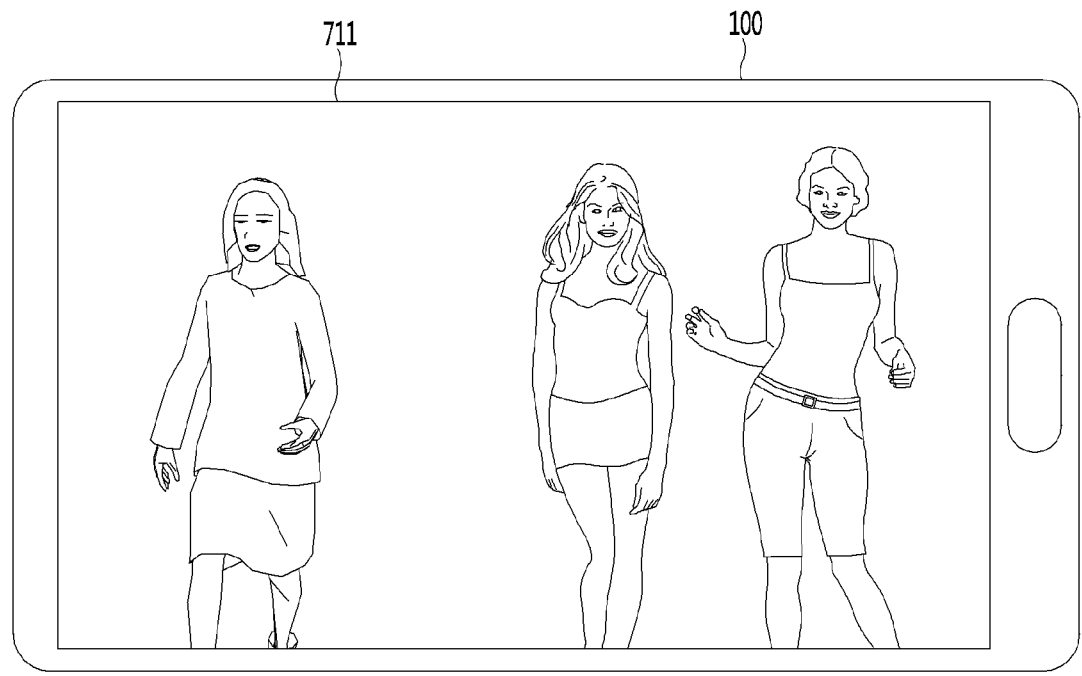

FIGS. 7a to 7e are diagrams illustrating an example of recognizing a moving person in an omnidirectional image and generating a moving image in an area including the moving person according to an embodiment of the present invention Referring to FIGS. 7a and 7b, in one embodiment of the present invention, the controller 180 of the mobile terminal 100 may search the omnidirectional image for an area in which an object moves. In addition, the controller 180 of the mobile terminal 100 may search for peripheral objects of the area in which the object moves and set an area including the moving object and the peripheral object thereof as a storage area.

For example, referring to FIG. 7a, it can be seen that only a person on the left moves and the other persons do not move through the timeline images 631 to 635. In this case, the controller 180 of the mobile terminal 100 may set an area including a moving object and fixed objects near the moving object as a storage area 710.

Accordingly, the controller 180 of the mobile terminal 100 may generate a moving image 711 including a moving object and fixed objects near the moving object.

According to the present invention, it is possible to generate a moving image including a moving object and a fixed object near the moving object and to obtain a moving image in various manners.

Figure 7C:
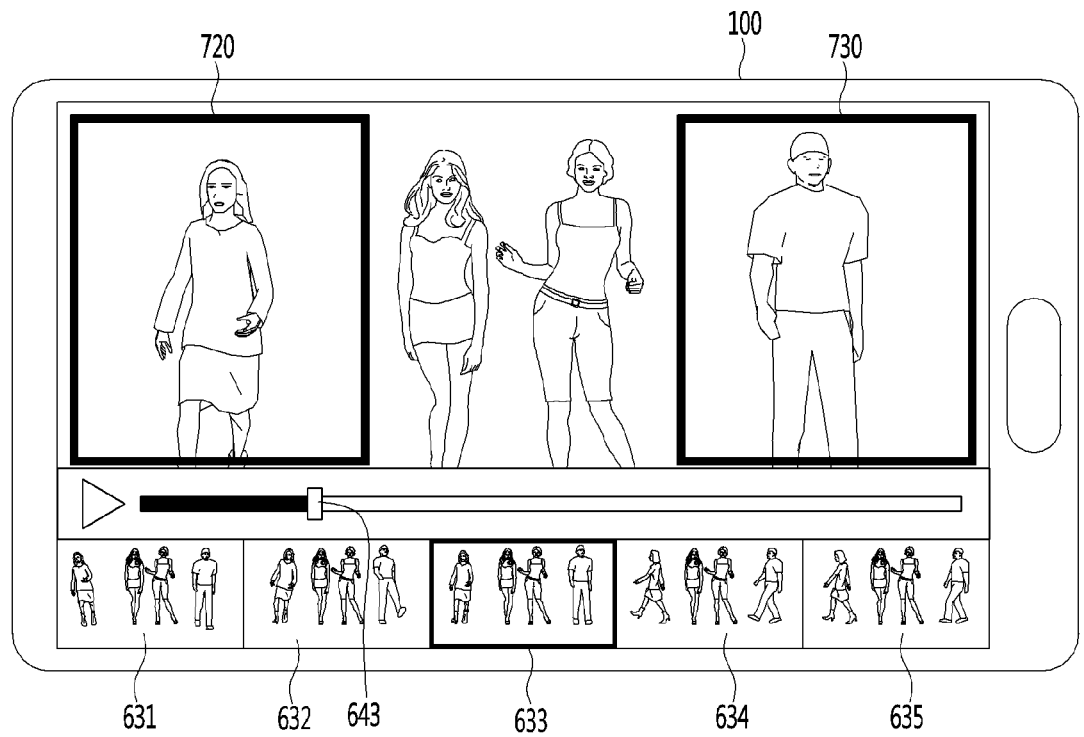
Figure 7D:
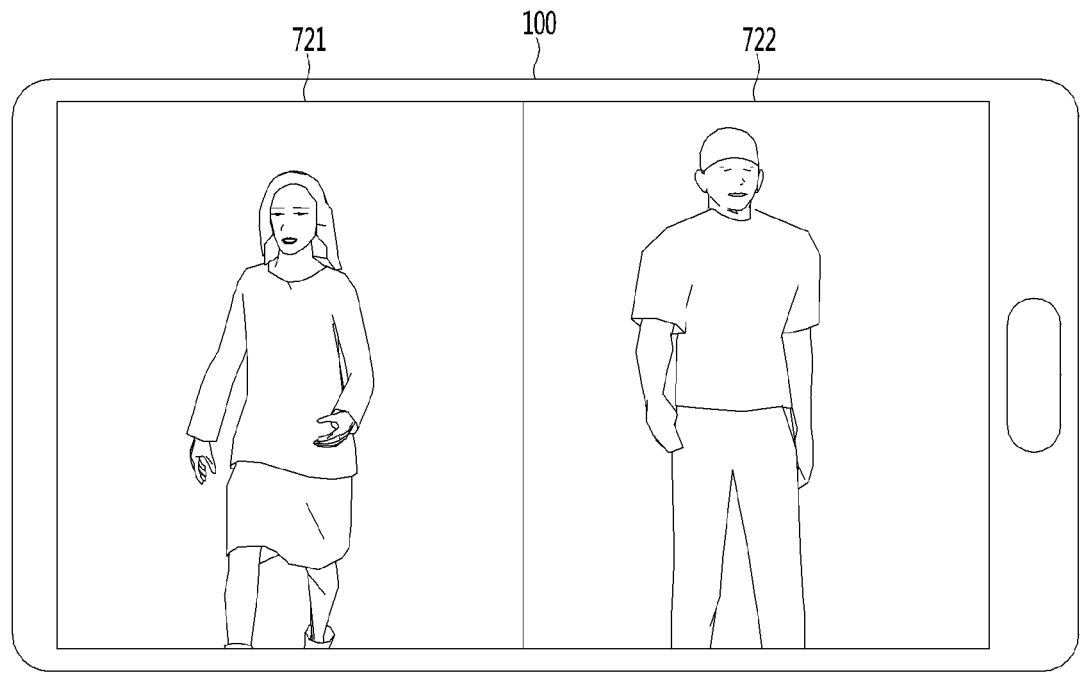

Referring to FIGS. 7c and 7d, in one embodiment of the present invention, the controller 180 of the mobile terminal 100 may search the omnidirectional image for a plurality of areas 720 and 730 in which objects move. The controller 180 of the mobile terminal 100 may display the searched areas on the display unit 151 of the mobile terminal 100.

For example, referring to FIG. 7c, it can be seen that only a person on the left and a person on the right move and the other persons do not move through the timeline images 631 to 635. In this case, the controller 180 of the mobile terminal 100 may distinguish between moving objects and fixed objects and set a plurality of areas 720 and 730, in which the objects move, as storage areas.

In one embodiment of the present invention, if the plurality of areas 720 and 730, in which the objects move, is present as the storage areas, the controller 180 of the mobile terminal 100 may generate moving images 721 and 722 corresponding to the plurality of areas.

In another embodiment of the present invention, if the plurality of areas 720 and 730, in which the objects move, is present as the storage areas, the controller 180 of the mobile terminal 100 may generate one moving image corresponding to the plurality of areas.

According to the present invention, if a plurality of moving objects is present, it is possible to generate moving images respectively corresponding to the plurality of areas or to generate a moving image including the plurality of moving areas. Therefore, it is possible to obtain a moving image in various manners.

Figure 7E:
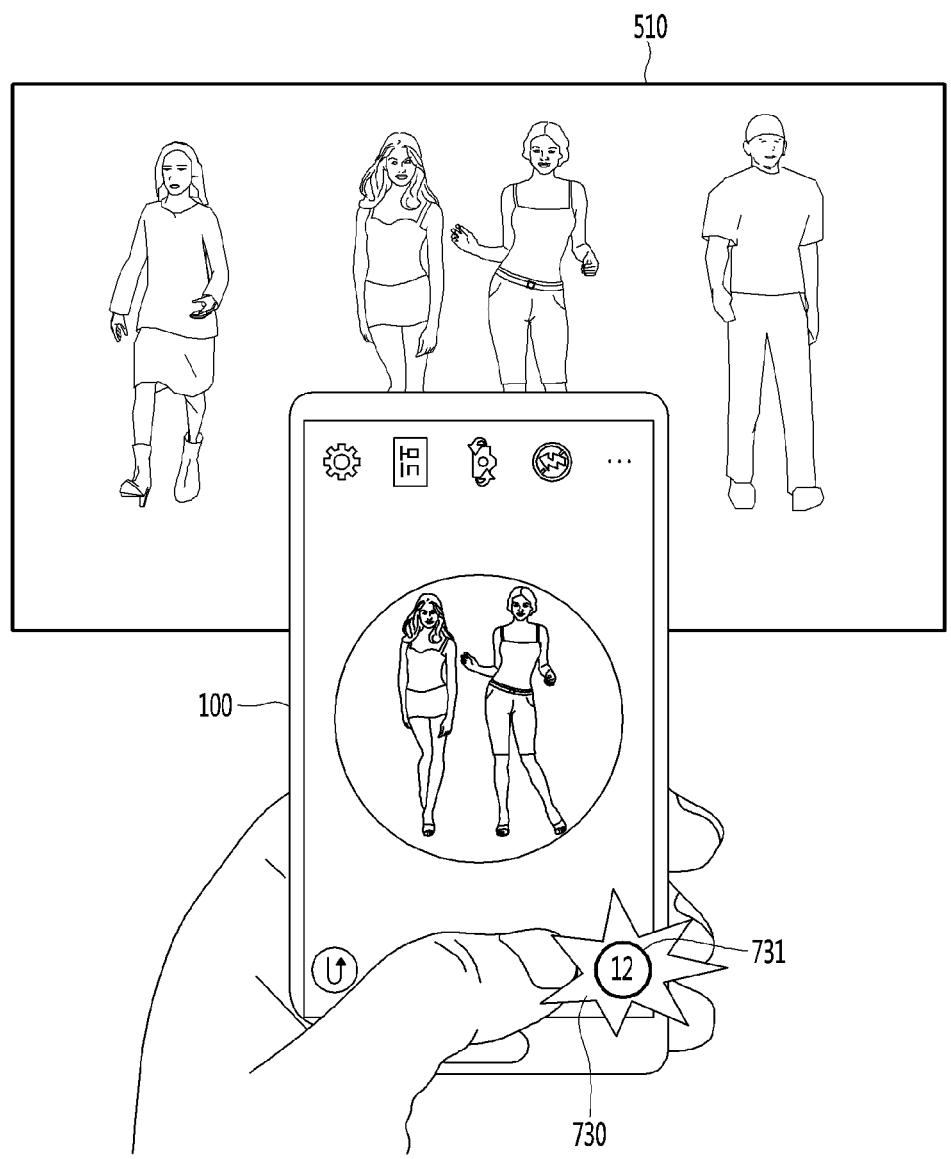

Referring to FIG. 7e, the controller 180 of the mobile terminal 100 may determine at least one of a time when a moving image is captured and the number of frames per second upon capturing the omnidirectional image.

For example, the user may set the mobile terminal to capture two images per second, to combine the captured images and to generate a moving image. In this state, when the user continuously presses a capture button, the controller 180 of the mobile terminal 100 enables the omnidirectional capture device 180 to capture a peripheral image at a predetermined period while pressing the capture button. As shown in FIG. 7e, if the user presses the capture button until 12 images are captured, the controller 180 of the mobile terminal 100 may obtain 12 images in 6 seconds and generate a moving image using the obtained images.

According to the present invention, the user of the mobile terminal 100 may capture the omnidirectional image at a desired period for a desired time. Accordingly, it is possible to more easily capture a moving image.

FIGS. 8a to 8d are diagrams illustrating an example of automatically tracking a moving object and generating a moving image according to an embodiment of the present invention.

Referring to FIG. 8a, the mobile terminal 100 may display a partial image 810 of an omnidirectional image 800 captured by the omnidirectional capture device 200.

In FIG. 8a, the mobile terminal 100 may receive the omnidirectional image corresponding to the omnidirectional image 800 from the omnidirectional capture device 200 but may not display the received omnidirectional image on the display unit 151.

In one embodiment of the present invention, the controller 180 of the mobile terminal 100 may receive the omnidirectional image from the omnidirectional capture device 200, track a moving object if present and generate a moving image.

For example, as shown in FIG. 8a, when a cat 801 moves in a predetermined direction 802, a moving image including the moving cat 801 may be generated.

Figure 8B:
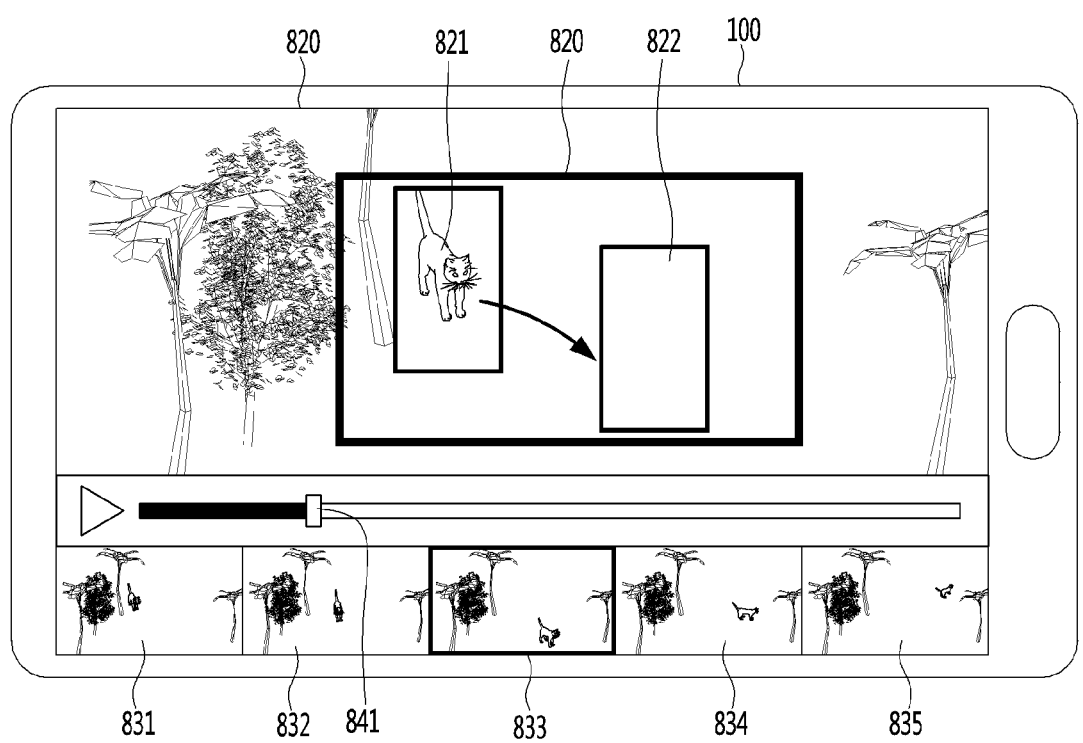

Referring to FIG. 8b, the controller 180 of the mobile terminal 100 may display a partial image 820 of the omnidirectional image on the display unit 151. In addition, the controller 180 of the mobile terminal 100 may display timeline images 831 to 835 corresponding to partial images 820 of the omnidirectional image at the lower end of the display unit 151. In addition, the controller 180 of the mobile terminal 100 may display a point of time when the image is displayed on the display unit 151.

In one embodiment of the present invention, if the cat 801 moves from a first position 821 to a second position 822, the controller 180 of the mobile terminal 100 may set an area 820 including the first position 821, the second position 822 and a movement path of the cat 801 from the first position 821 to the second position 822 as a storage area.

Figure 8C:
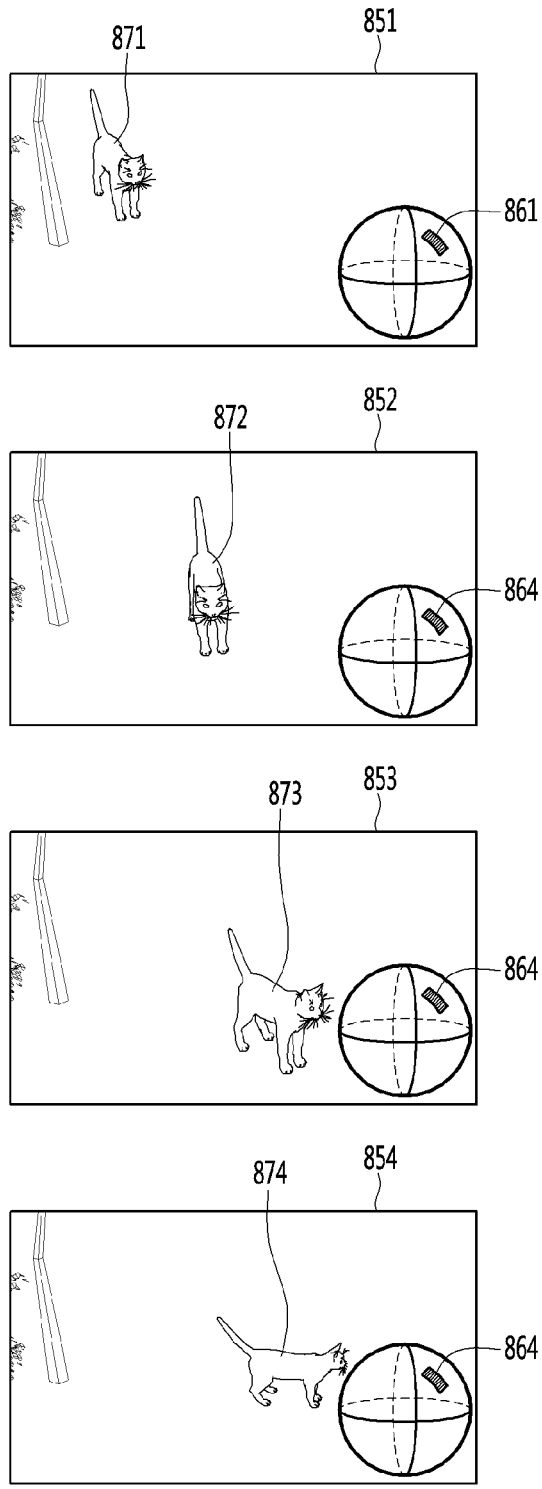

For example, if the storage area is set as shown in FIG. 8c, the controller 180 of the mobile terminal 100 may fix the angle of view of the moving image and generate a moving image including the moving images 851 to 854 of the cat 871 to 874 as the target object within the fixed angle of view. In addition, the controller 180 of the mobile terminal 100 may display the position of the angle of view in a spherical shape. In this case, the angle of view 864 is constant.

Although the moving image includes four images, the number of images included in the moving image is not fixed and may be variously changed.

Refer to FIG. 8b again.

In another embodiment of the present invention, if the cat 801 moves from the first position 821 to the second position 822, the controller 180 of the mobile terminal 100 may set the storage area such that the cat 801 is located at the center of the area when the cat 801 moves from the first position 821 to the second position 822. In this case, the storage area may move while the cat 801 as the moving object moves.

For example, if the storage area is set as shown in FIG. 8d, the controller 180 of the mobile terminal 100 may generate a moving image including images 891 to 893 in which the cats 881 to 883 as the target object are located at the center of the area, by changing the angle of view as the moving object moves. In addition, the controller 180 of the mobile terminal 100 may display the position of the angle of view in a spherical shape. In this case, it can be seen that the positions of the angles of view 894 to 896 are different.

Although the moving image includes three images, the number of images included in the moving image is not fixed and may be variously changed.

FIGS. 9a to 9d are diagrams illustrating an example of selecting a moving object or an area and generating a moving image according to an embodiment of the present invention.

In one embodiment of the present invention, the controller 180 of the mobile terminal 100 may set an arbitrary area or an area including an arbitrary object as a storage area.

Figure 9A:
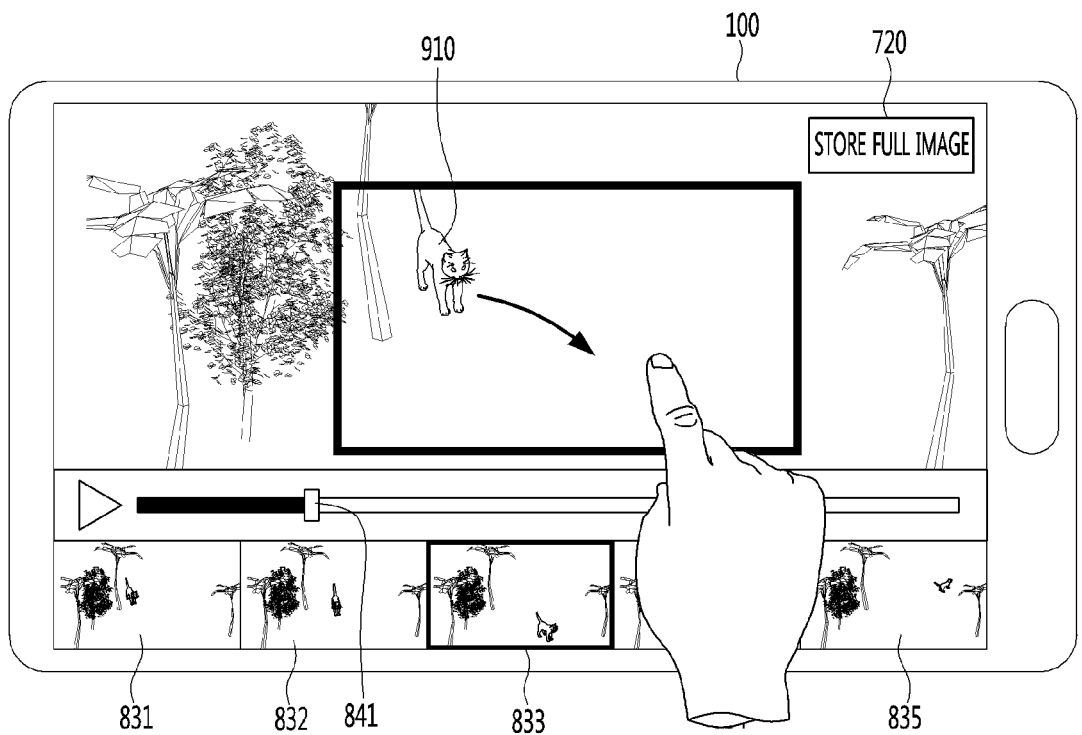
FIGS. 9a to 9d are diagrams illustrating an example of selecting a moving object or an area and generating a moving image according to an embodiment of the present invention.
Figure 9B:
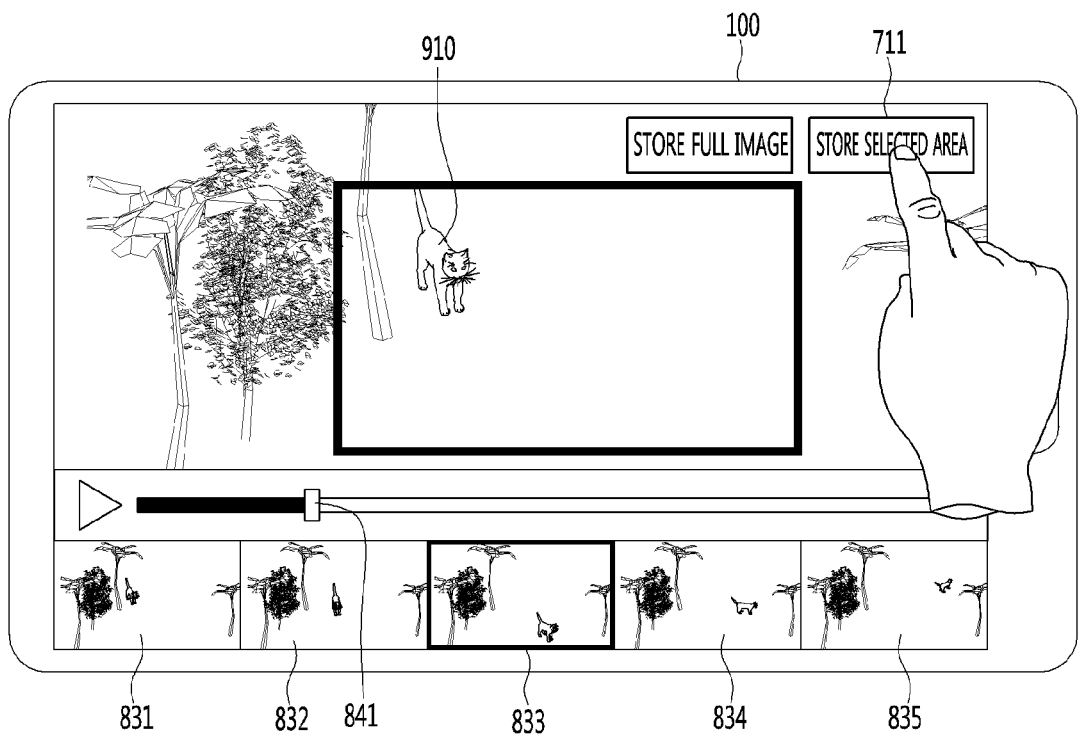

Referring to FIGS. 9a and 9b, the controller 180 of the mobile terminal 100 may receive information on the storage area from the user using the display unit 151. When a first area 910 is selected as a storage area and a selected area storage button 911 is pressed, the controller 180 of the mobile terminal 100 may generate a moving image corresponding to the storage area.

Figure 9C:
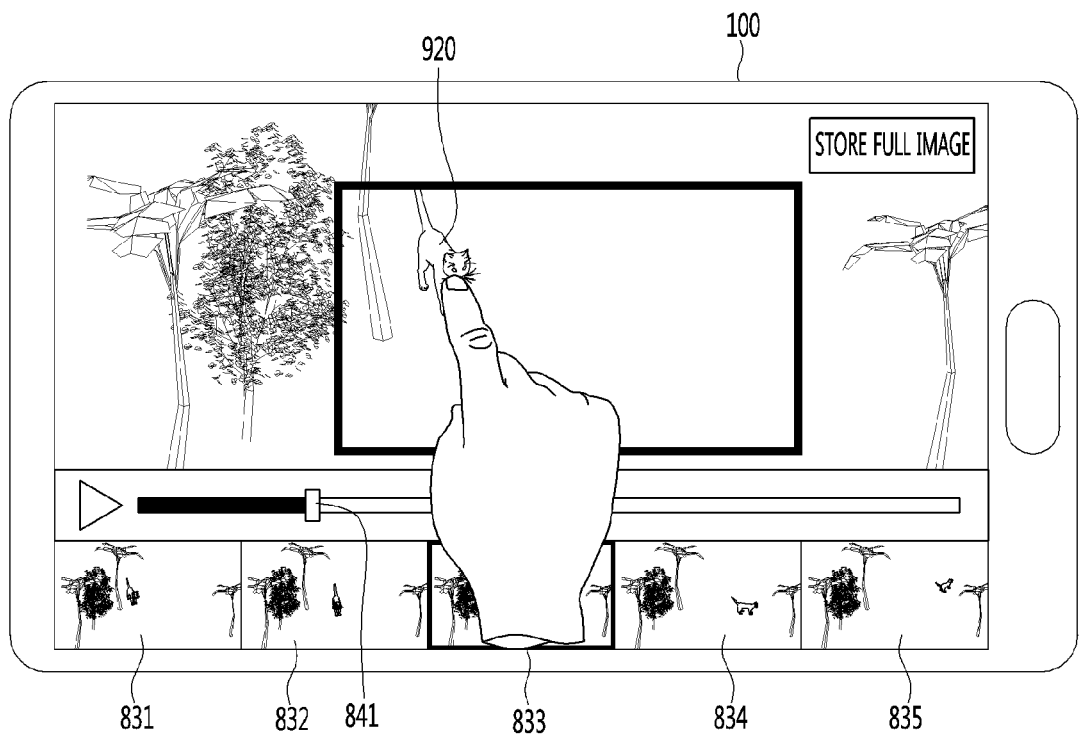
Figure 9D:
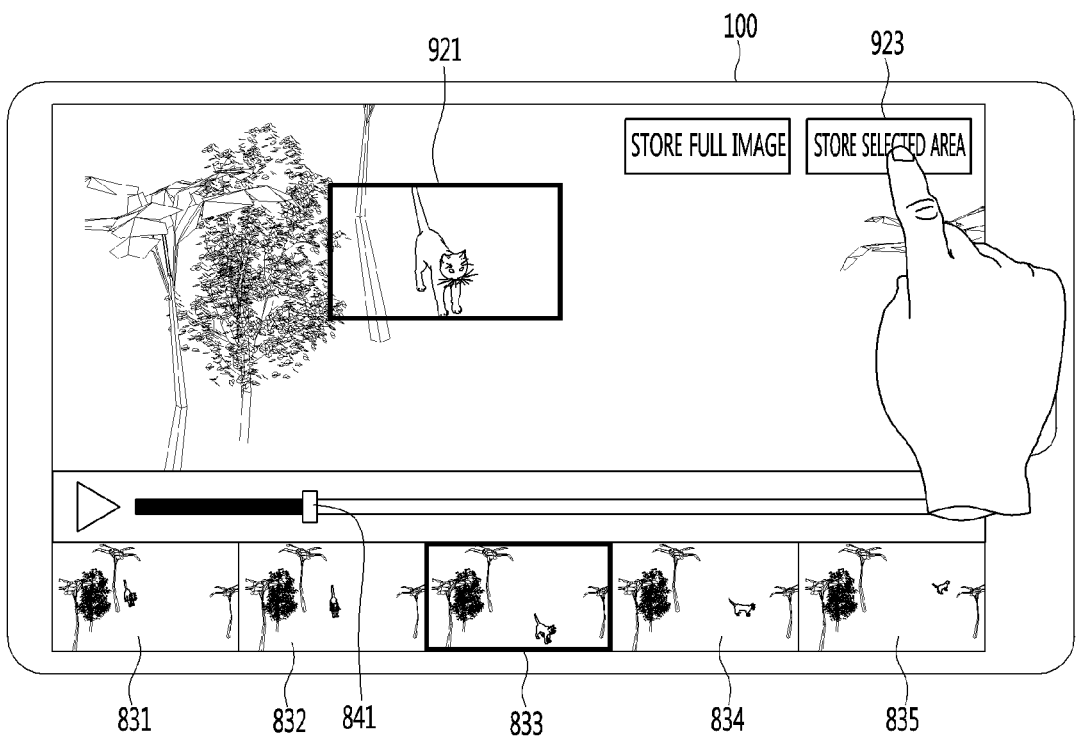

Referring to FIGS. 9c and 9d, when a gesture of selecting a cat 920 is input to the display unit 151, the controller 180 of the mobile terminal 100 may set a storage area centered on the cat 920. In addition, when a gesture of selecting a selected object storage button 923 is received, a moving image corresponding to the storage area may be generated. In this case, as shown in FIG. 8d, a moving image including an image in which the cat 920 as the target object is located at the center of the area may be generated.

Figure 10A:
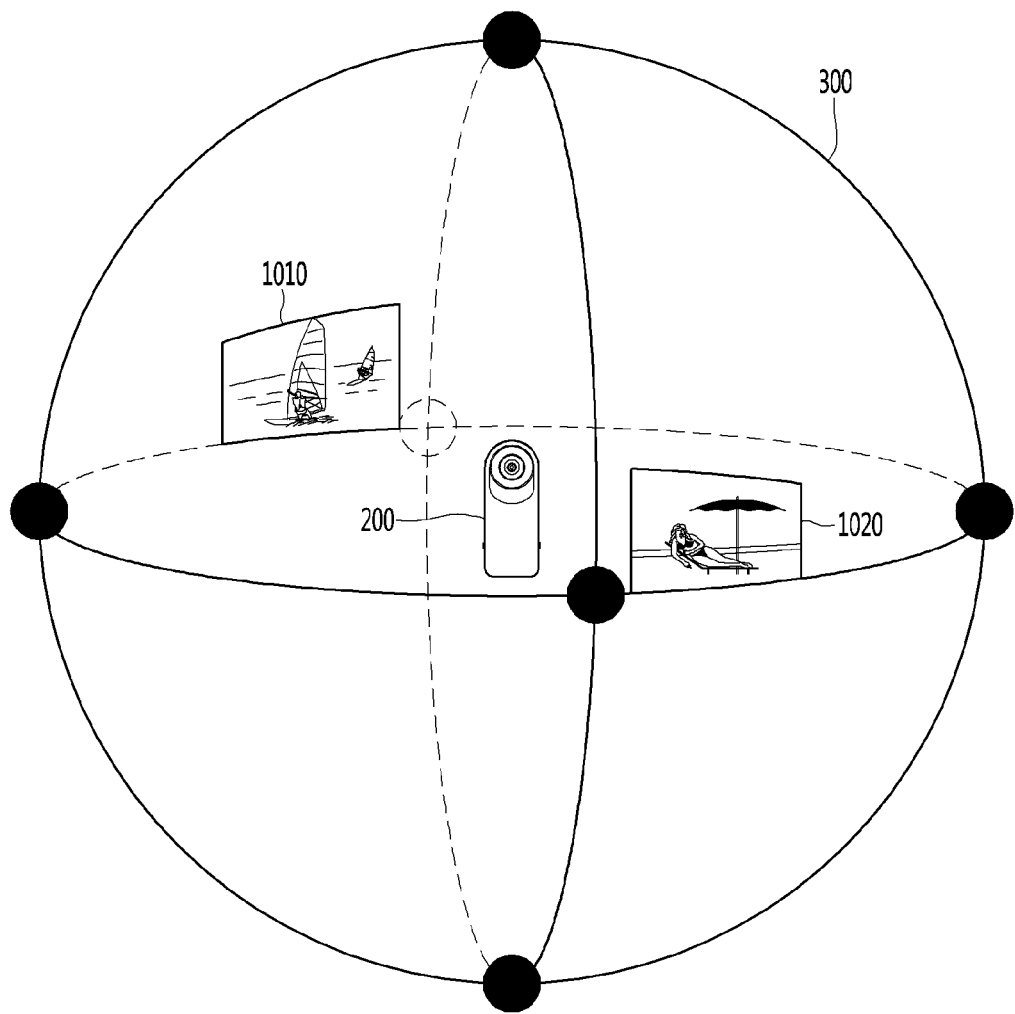
FIGS. 10a to 10c are diagrams illustrating an example of generating a moving image corresponding to front and rear sides of an omnidirectional capture device.
Figure 10B:
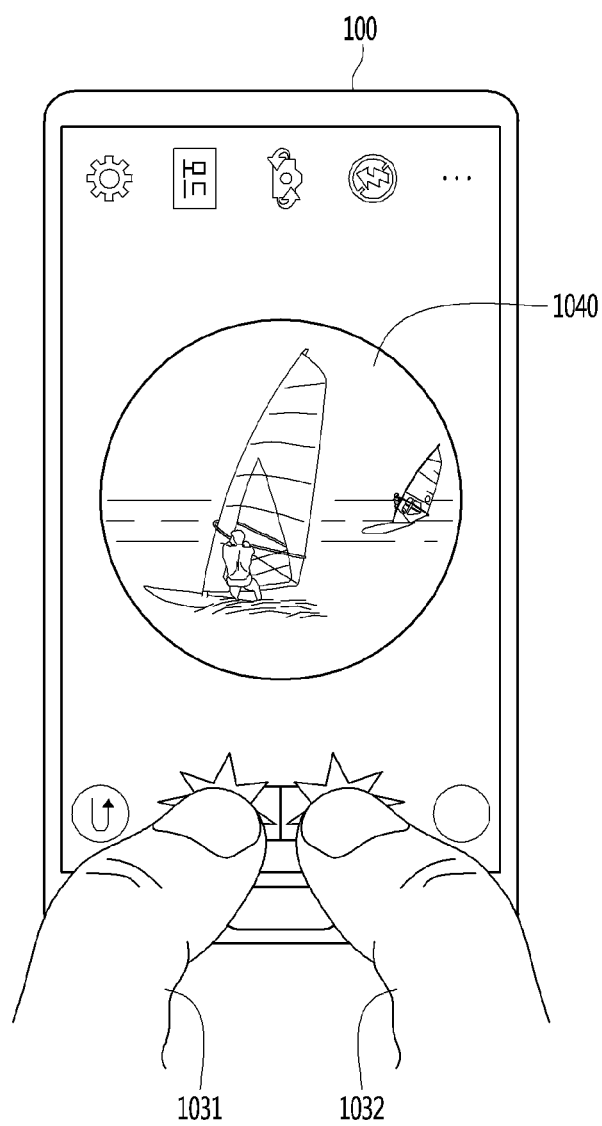
Figure 10C:
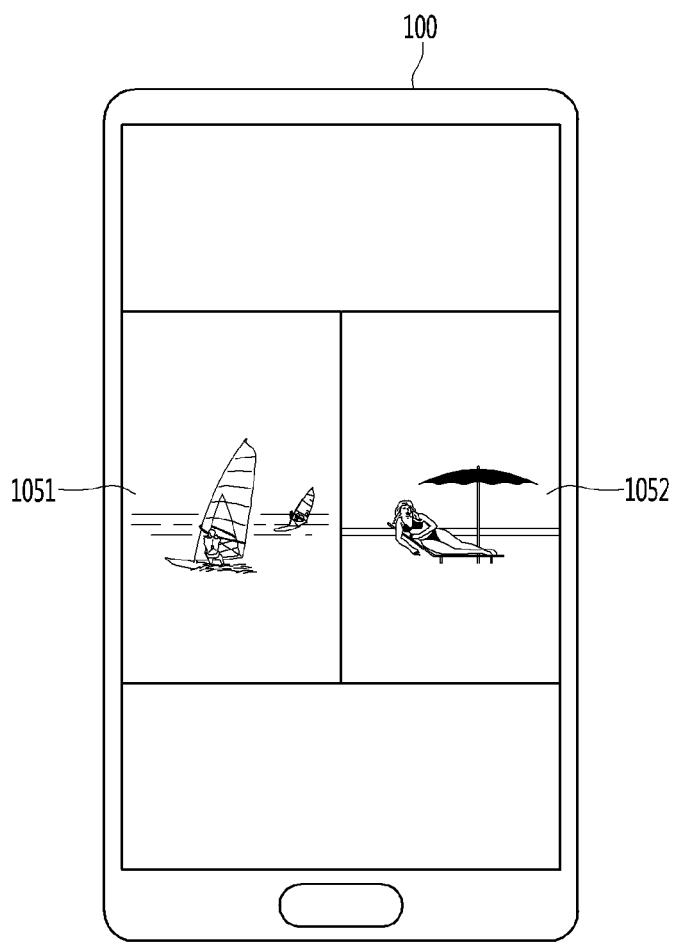

FIGS. 10a to 10c are diagrams illustrating an example of generating a moving image corresponding to front and rear sides of an omnidirectional capture device.

In one embodiment of the present invention, the controller 180 of the mobile terminal 100 may generate a moving image using images of front and rear areas when moving objects are located at the front and rear sides of the omnidirectional capture device 200.

For example, as shown in FIG. 10a, a moving object 1010 is present at the front side of the omnidirectional capture device 200 and a moving object 1020 is present at the rear side of the omnidirectional capture device 200. In this case, the omnidirectional capture device 200 may simultaneously capture the moving object 1010 and the moving object 1020. In addition, the controller 180 of the mobile terminal 100 may generate a moving image including the moving object 1010 and the moving object 1020.

In one embodiment of the present invention, a gesture of simultaneously capturing front and rear images and generating a moving image may be performed by inputting a second input signal 1032 to the display unit 151 in a state of inputting a first input signal 1031 to the display unit 151. However, the present invention is not limited to this gesture and a moving image may be generated using various gestures.

Referring to FIG. 10c, in one embodiment of the present invention, when a plurality of areas, in which objects move, is present, that is, when a moving object 1010 and a moving object 1020 are present at the front and rear sides of the omnidirectional capture device, the controller 180 of the mobile terminal 100 may generate moving images 1051 and 1052 respectively corresponding to the plurality of areas. In addition, one moving image including the plurality of areas may be generated.

Figure 11A:
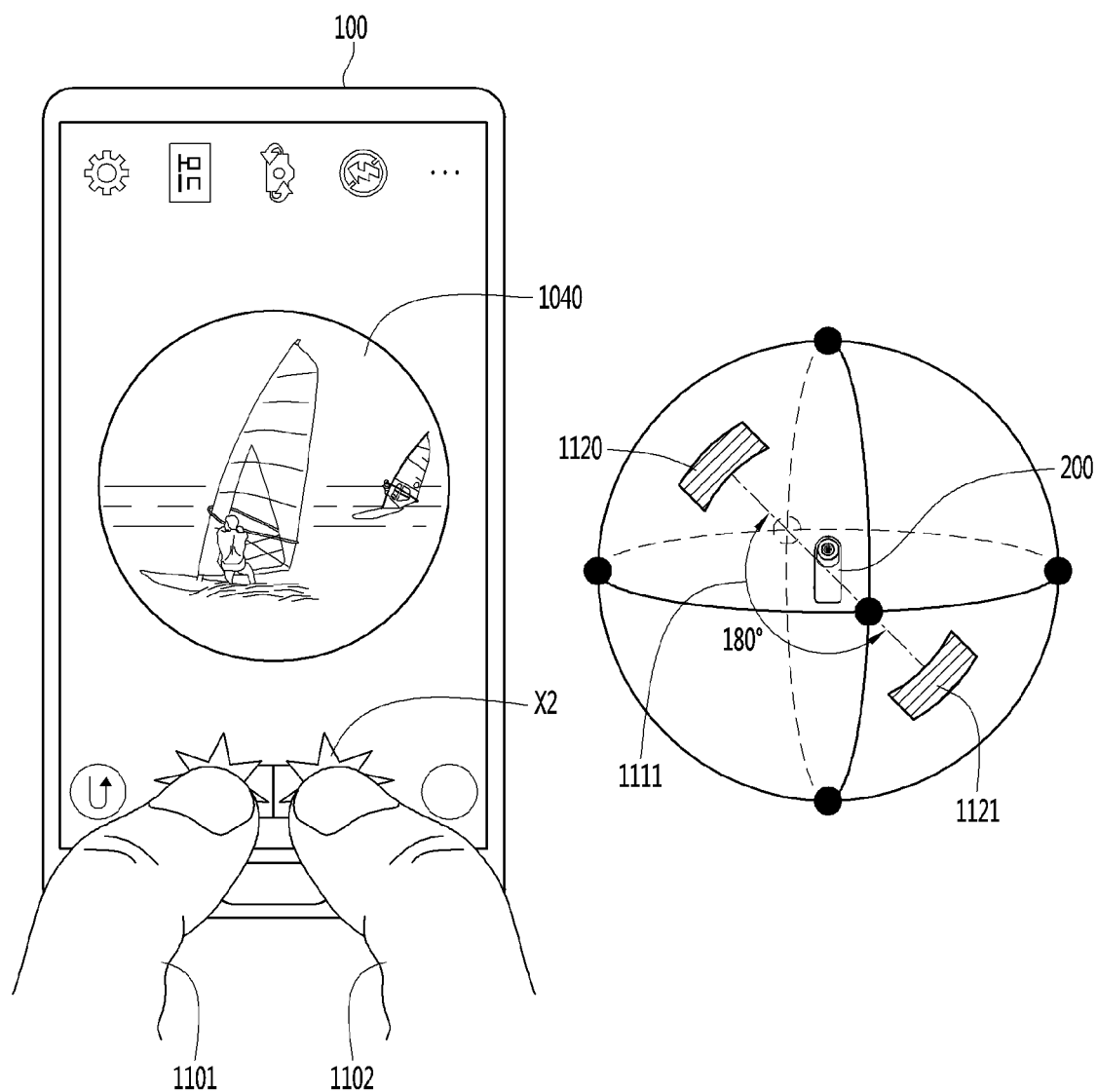
FIGS. 11a and 11b are diagrams illustrating an example of generating a moving image corresponding to a plurality of specific angles of an omnidirectional capture device.
Figure 11B:
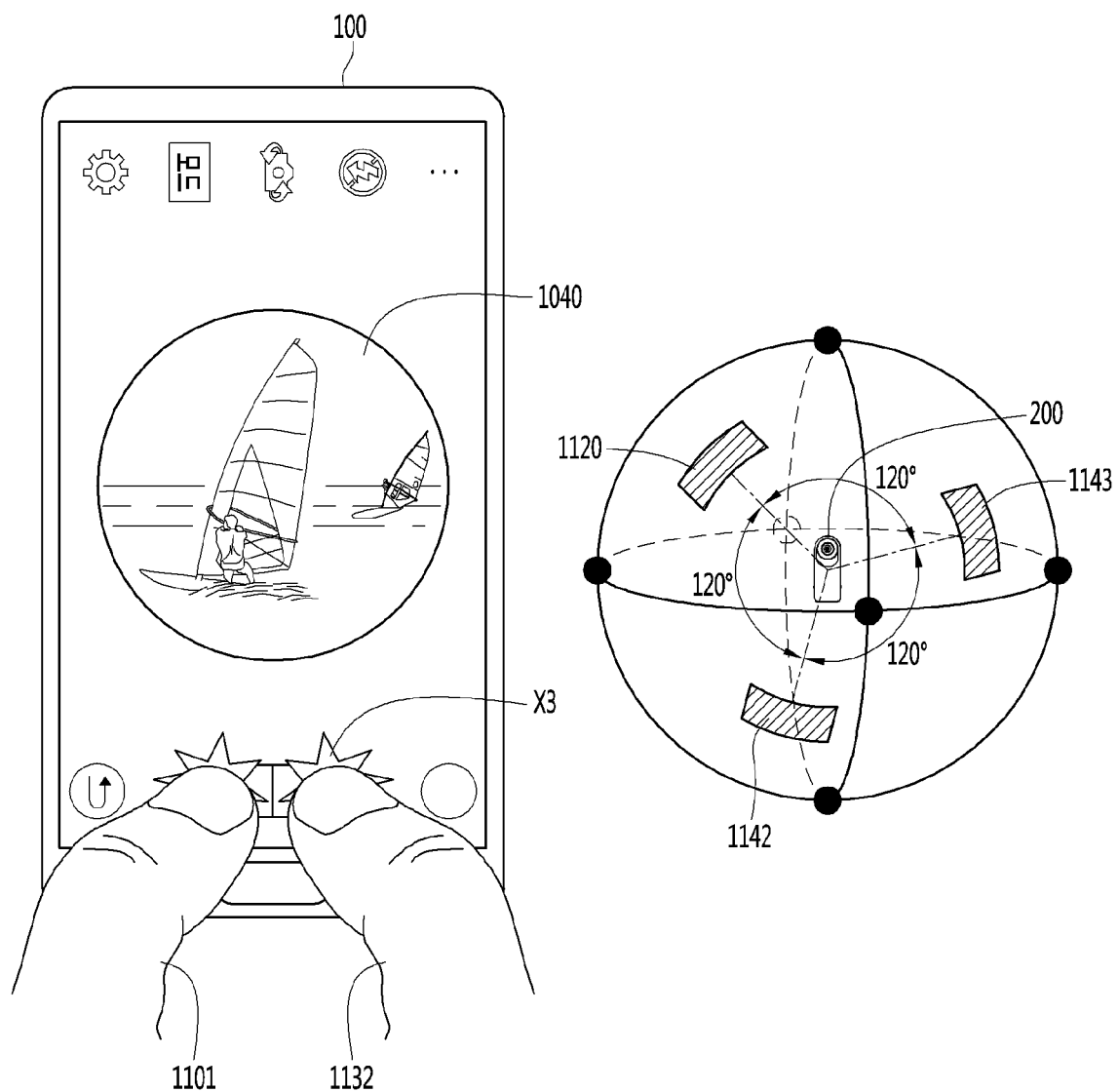

FIGS. 11a and 11b are diagrams illustrating an example of generating a moving image corresponding to a plurality of specific angles of an omnidirectional capture device.

In one embodiment of the present invention, a gesture of simultaneously capturing front and rear images and generating a moving image may control a capture angle of an omnidirectional image according to the number of times of inputting a second input signal 1132 in a state of inputting a first input signal 1101 to the display unit 151. As shown in FIG. 11a, when the second input signal 1132 is input two times, the controller 180 of the mobile terminal 100 may divide the omnidirectional image into front and rear portions 1120 and 1121 at an angle of 180° 1111 therebetween. In addition, as shown in FIG. 11*b*, when the second input signal 1132 is input three times, the controller 180 of the mobile terminal 100 may divide the omnidirectional image into three portions 1120, 1142 and 1143 at an angle of 120° therebetween.

The above-described embodiments are merely exemplary and gestures other than the above-described gestures may be used. The omnidirectional image may be divided into n portions at a uniform angle therebetween.

FIGS. 12*a* to 12*e* are diagrams illustrating an example of generating a moving image corresponding to a specific angle of an omnidirectional capture image.

Figure 12A:
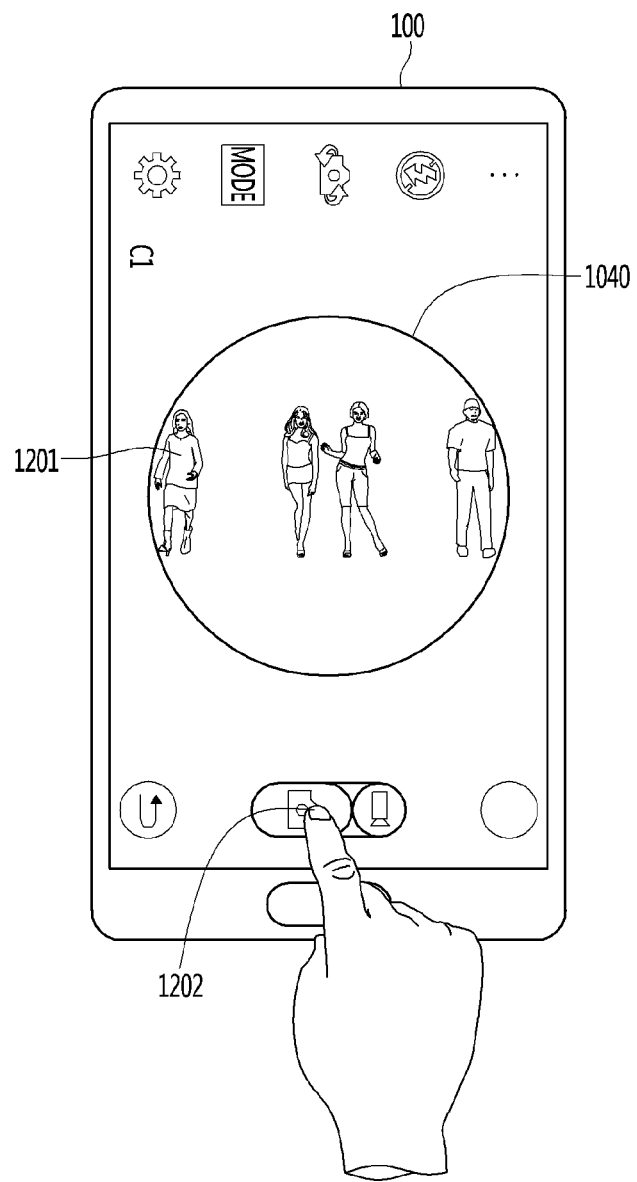
FIGS. 12a to 12e are diagrams illustrating an example of generating a moving image corresponding to a specific angle of an omnidirectional capture image.

Referring to FIG. 12*a*, in one embodiment of the present invention, the controller 180 of the mobile terminal 100 may display the full omnidirectional image on the display unit 151. In this case, the image may be distorted but the full distorted omnidirectional image may be displayed on the display unit 151. That is, the controller 180 of the mobile terminal 100 may display the omnidirectional image on the display unit 151 in a spherical shape. If the omnidirectional image is displayed in the spherical shape, the image may be distorted and thus an object may not be accurately designated.

Figure 12B:
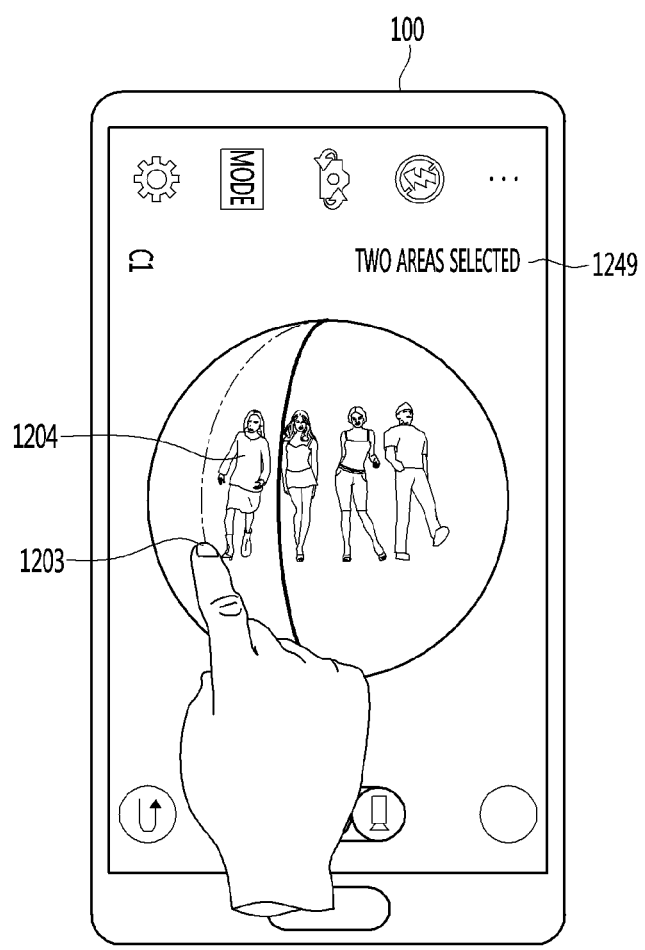
Figure 12C:
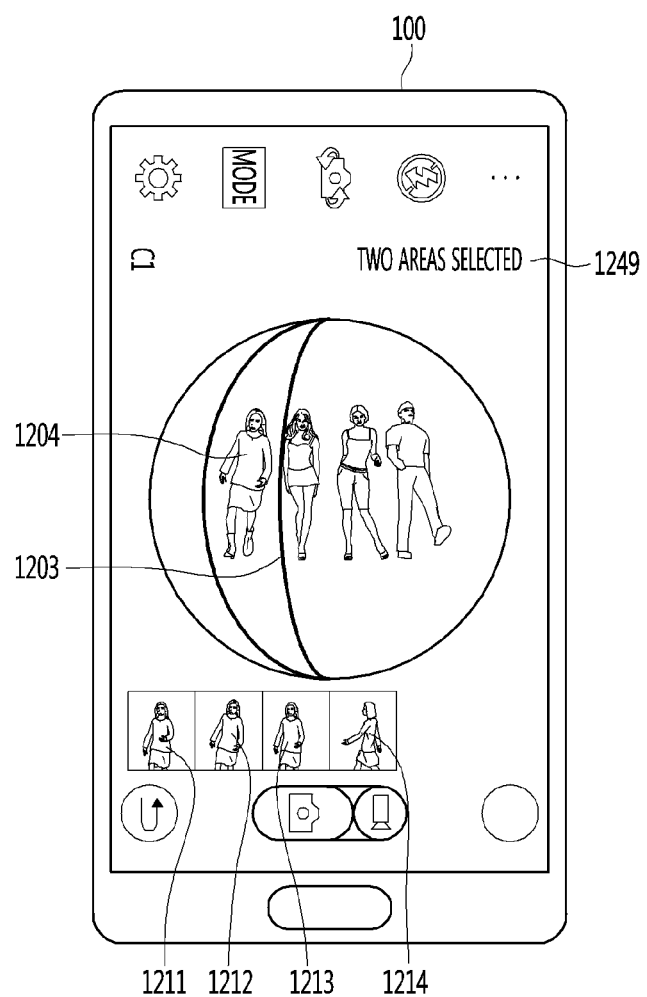

Referring to FIGS. 12*b* and 12*c*, in one embodiment of the present invention, if the omnidirectional image is displayed in the spherical shape, a guide line 1203 may be designated in order to generate a moving image including an object 1204. Accordingly, the controller 180 of the mobile terminal 100 may generate a moving image including the object 1204 located between two guide lines 1203. In addition, the controller 180 of the mobile terminal 100 may display timeline images 1211 to 1214 corresponding to partial images of the omnidirectional image at the lower end of the display unit 151.

Figure 12D:
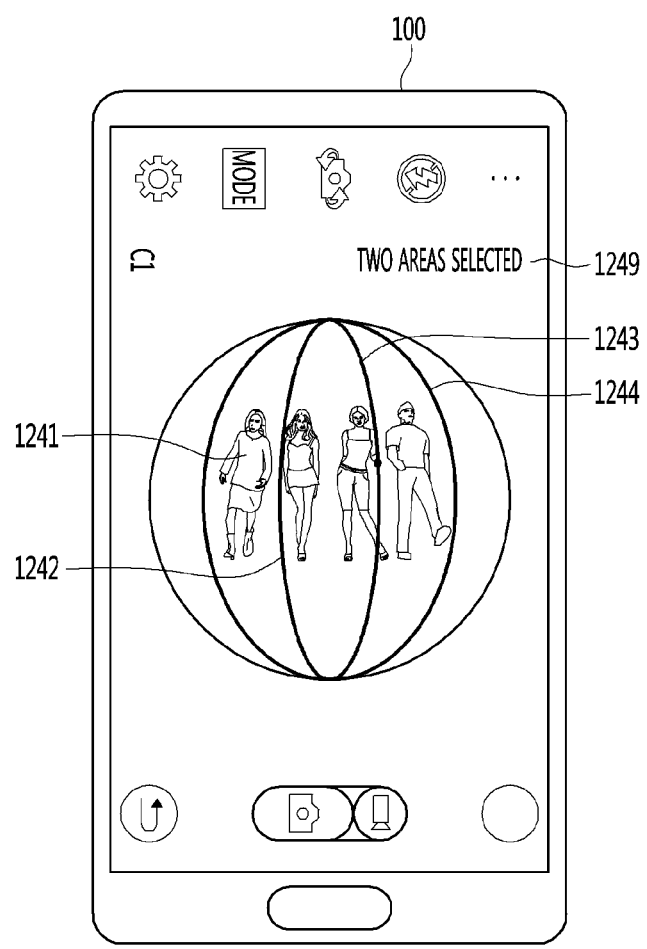
Figure 12E:
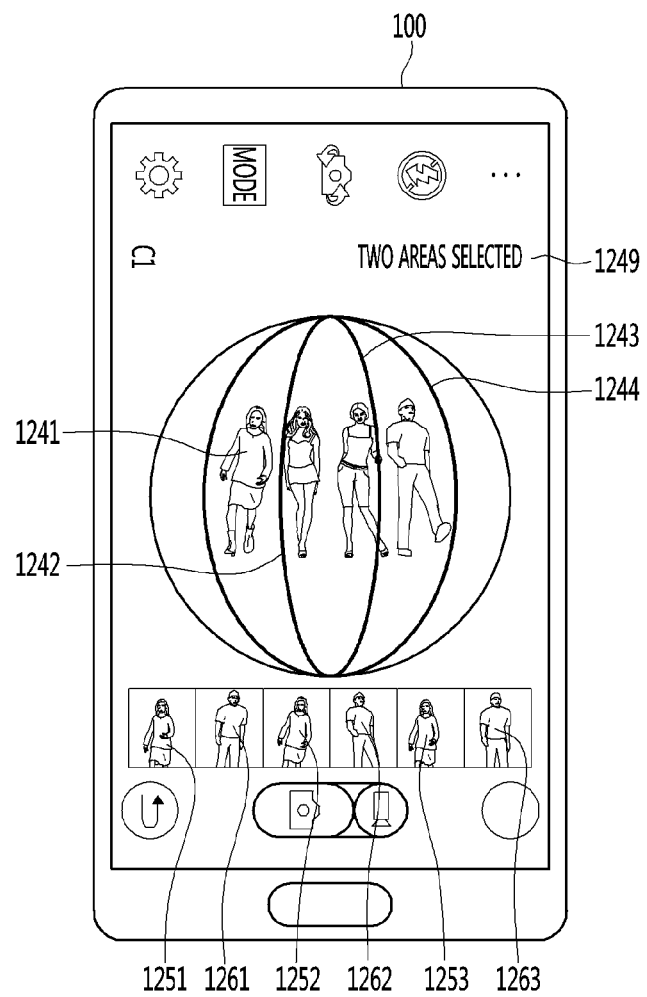

Referring to FIGS. 12*c* and 12*d*, in one embodiment of the present invention, if the omnidirectional image is displayed in the spherical shape, guide lines 1242 and 1244 may be designated in order to generate a moving image including a plurality of objects 1241 and 1243. Accordingly, the controller 180 of the mobile terminal 100 may generate a moving image including the objects 1242 and 1244 located between two guide lines. That is, if a plurality of objects to be used to generate a moving image is present in the spherical image, the objects may be selected using a plurality of guide lines. Accordingly, even when a plurality of objects is present, it is possible to select the objects using the guide lines. In addition, a notice 1249 indicating the number of selected areas may be displayed on the display unit 151 of the mobile terminal 100.

In addition, the controller 180 of the mobile terminal 100 may display timeline images 1251 to 1253 and 1261 to 1263 corresponding to the partial images of the omnidirectional image at the lower end of the display unit 151. Accordingly, it is possible to more easily confirm a moving image to be generated.

FIGS. 13*a* to 13*e* are diagrams illustrating an example of adjusting an angle of view at a specific angle of an omnidirectional capture image and generating a moving image.

In one embodiment of the present invention, the controller 180 of the mobile terminal 100 may set the angle of view of a moving image centered on a selected object.

Figure 13A:
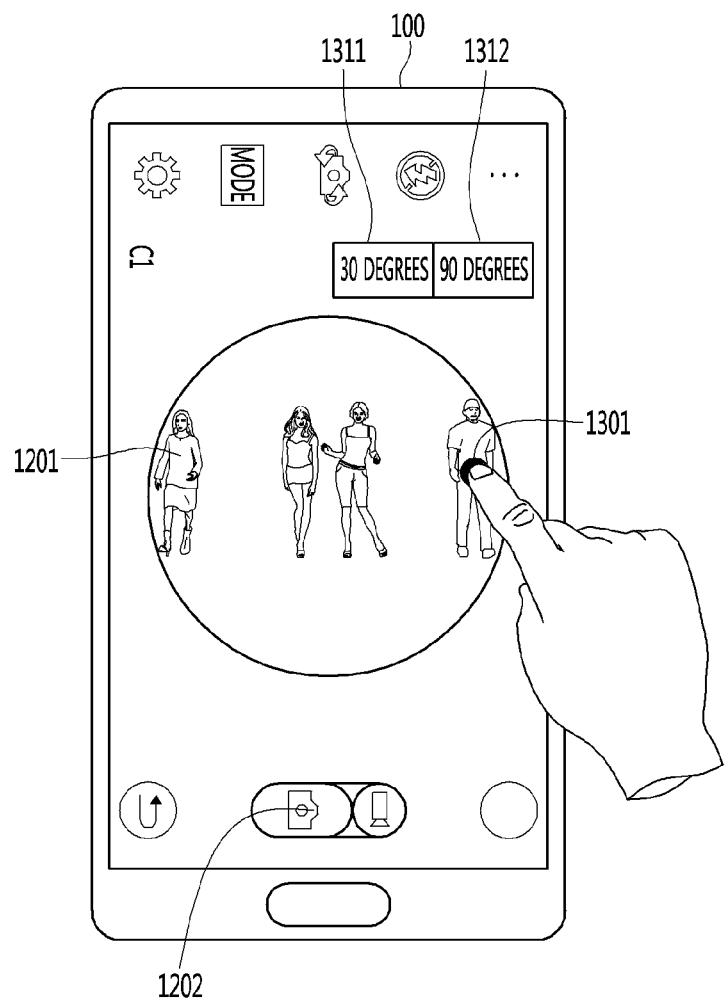
FIGS. 13a to 13e are diagrams illustrating an example of adjusting an angle of view at a specific angle of an omnidirectional capture image and generating a moving image.
Figure 13B:
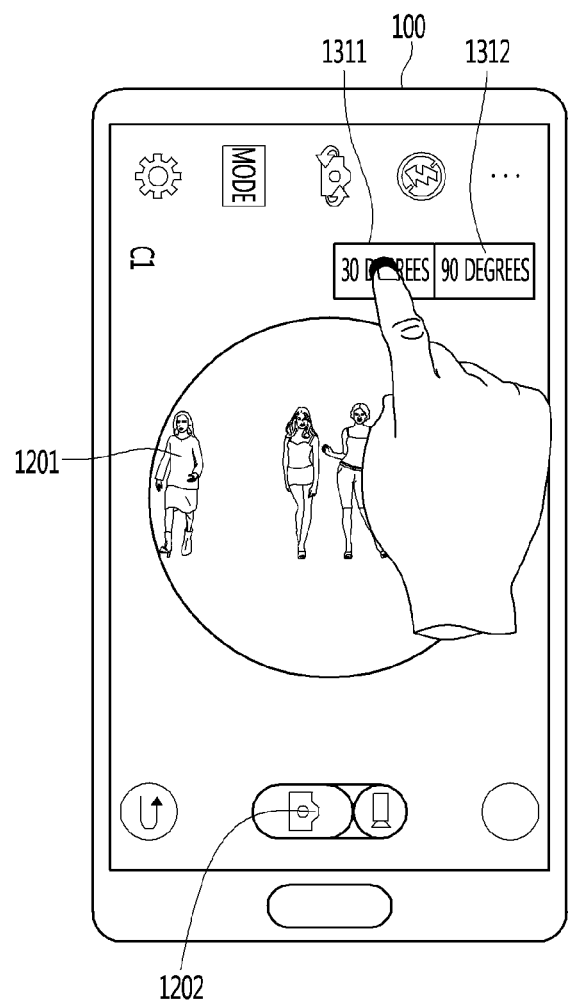
Figure 13C:
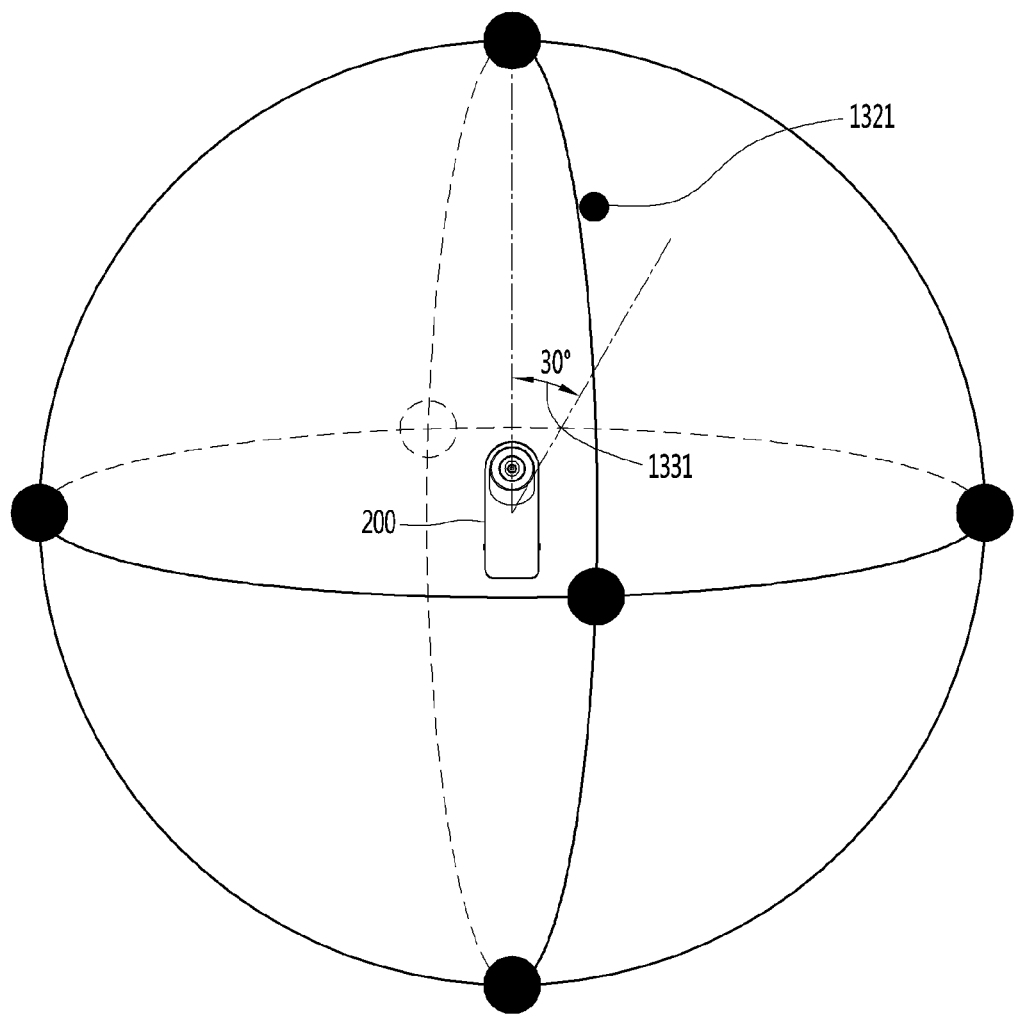

Referring to FIGS. 13*a* to 13*c*, the user may select an object 1301 to be used to generate a moving image from the image displayed on the display unit 151 of the mobile terminal 100. In addition, the angle of view of the image centered on the object 1301 may be selected. For example, when the user selects 30 degrees (1311), the controller 180 of the mobile terminal 100 may determine a storage area having the object 1301 located at the center thereof and having an angle of view of 30°.

Figure 13D:
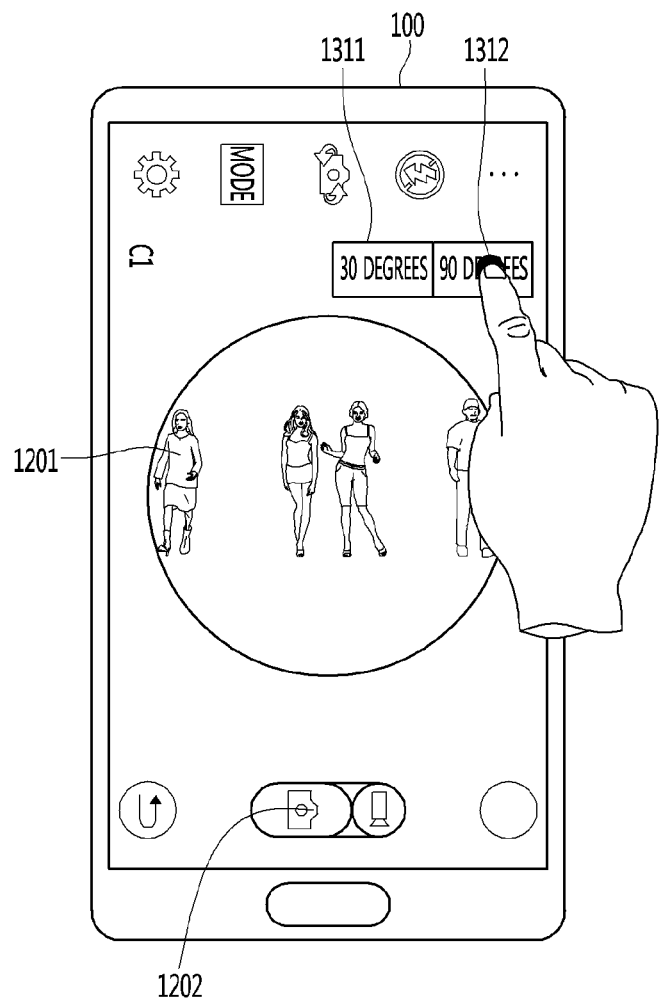
Figure 13E:
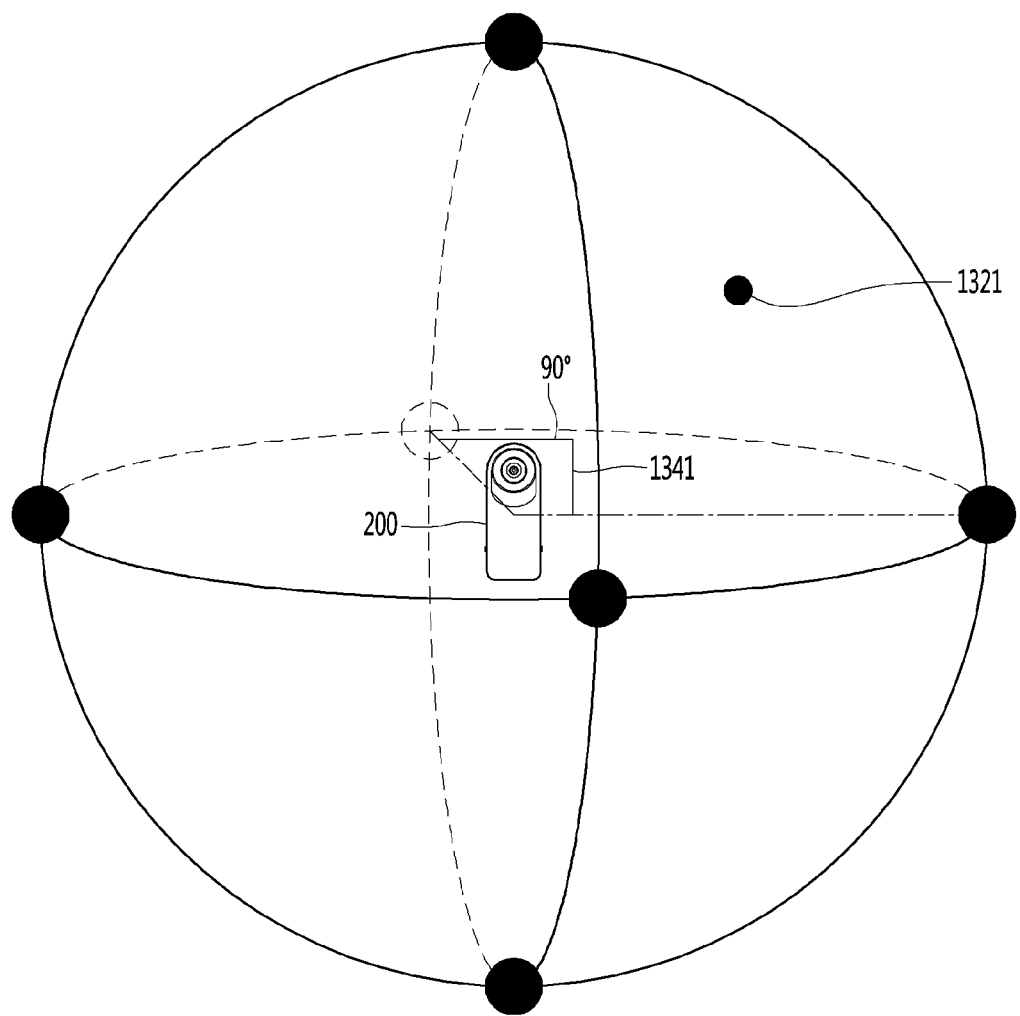
Figure 14A:
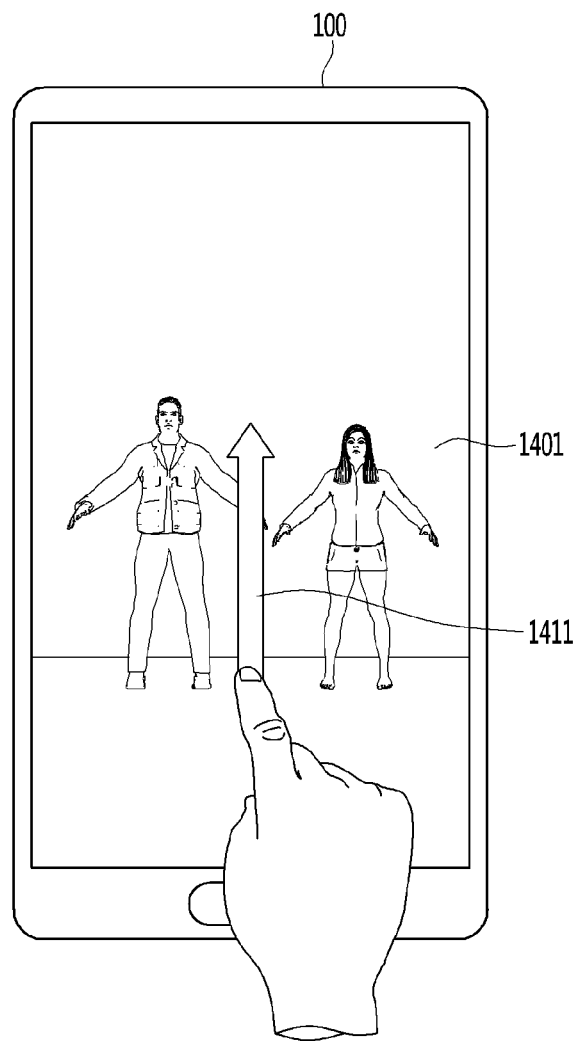
FIGS. 14a to 14d are diagrams illustrating a method of moving an image when input corresponding to movement is received in a moving image.
Figure 14B:
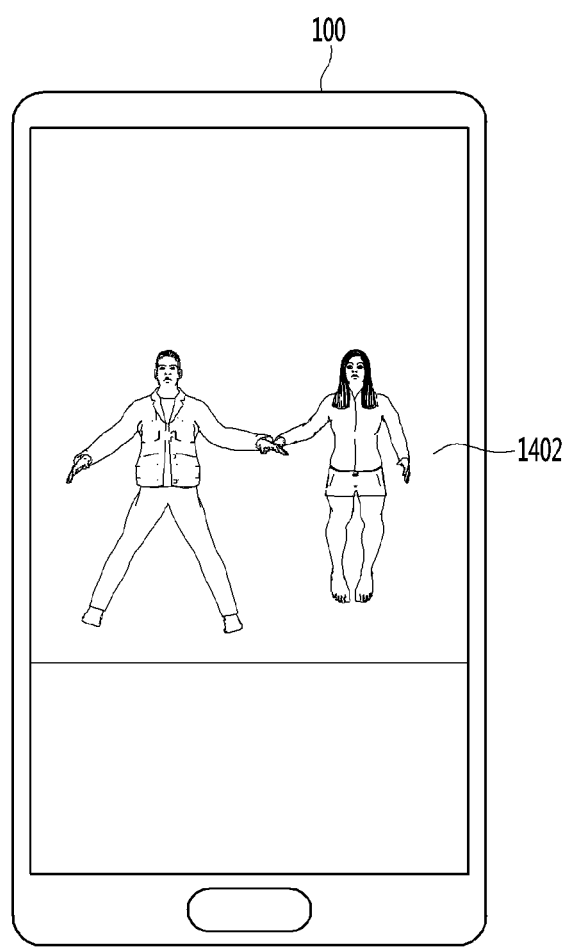
Figure 14C:
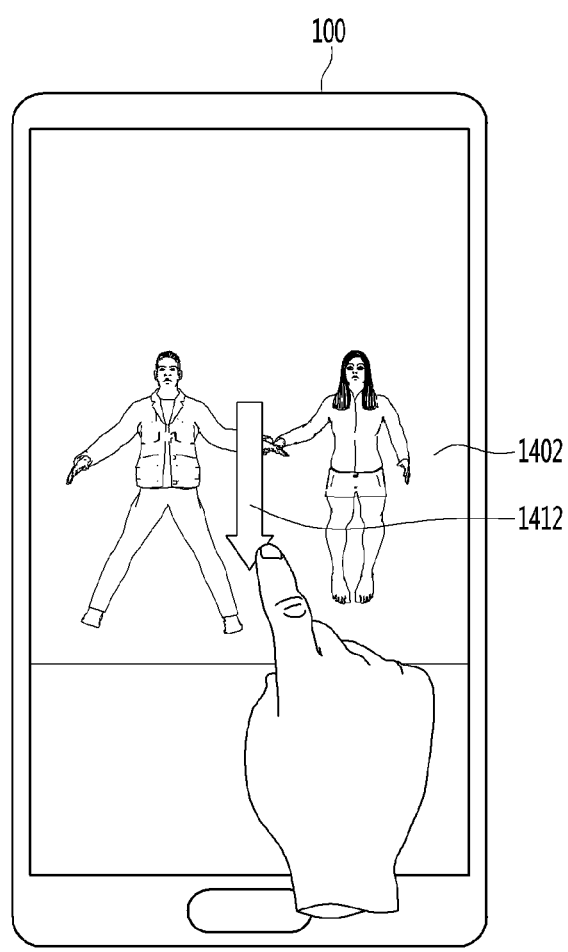
Figure 14D:
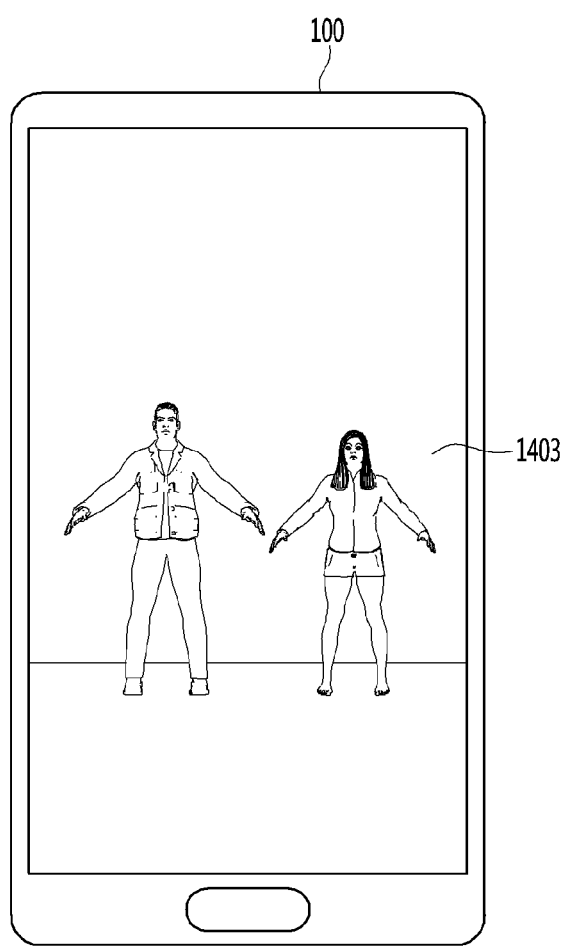

Referring to FIGS. 13*d* and 13*e*, when the user selects 90 degrees (1312), the controller 180 of the mobile terminal 100 may determine a storage area having the object 1301 located at the center thereof and having an angle of view of 90°.

FIGS. 14*a* to 14*d* are diagrams illustrating a method of moving an image when input corresponding to movement is received in a moving image.

In one embodiment of the present invention, the controller 180 of the mobile terminal 100 may store a movement direction of an object in a moving image 1401.

In addition, the controller 180 of the mobile terminal 100 may enable a moving image to move if a gesture 1411 corresponding to the movement direction of the object in the moving image 1401 is received.

Referring to FIGS. 14*a* to 14*d*, a moving image stored in the memory 170 of the mobile terminal is an image in which a man and a woman jump up and down.

When the user inputs a gesture 1411 of scrolling up in a state in which the moving image 1401 is stopped, the controller 180 of the mobile terminal 100 may play a moving image until the man and the woman jump up to peaks thereof (1402).

In addition, the controller 180 of the mobile terminal 100 may stop the moving image in the state in which the man and the woman jump up to the peaks thereof (1402).

In this state, when the user inputs a gesture 1412 of scrolling down, the controller 180 of the mobile terminal 100 may play the moving image until the man and the woman land (1403).

According to the present invention, the user of the mobile terminal may play the moving image in consideration of movement of the object.

Figure 15A:
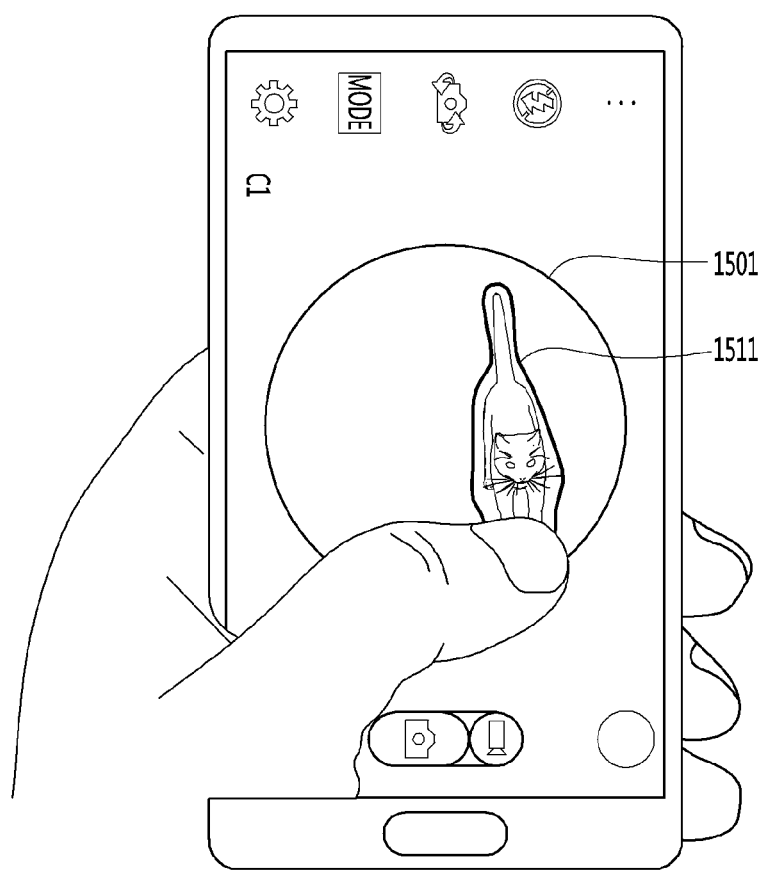
FIGS. 15a and 15b are diagrams illustrating a method of moving an image when input corresponding to movement is received from a moving image.
Figure 15B:
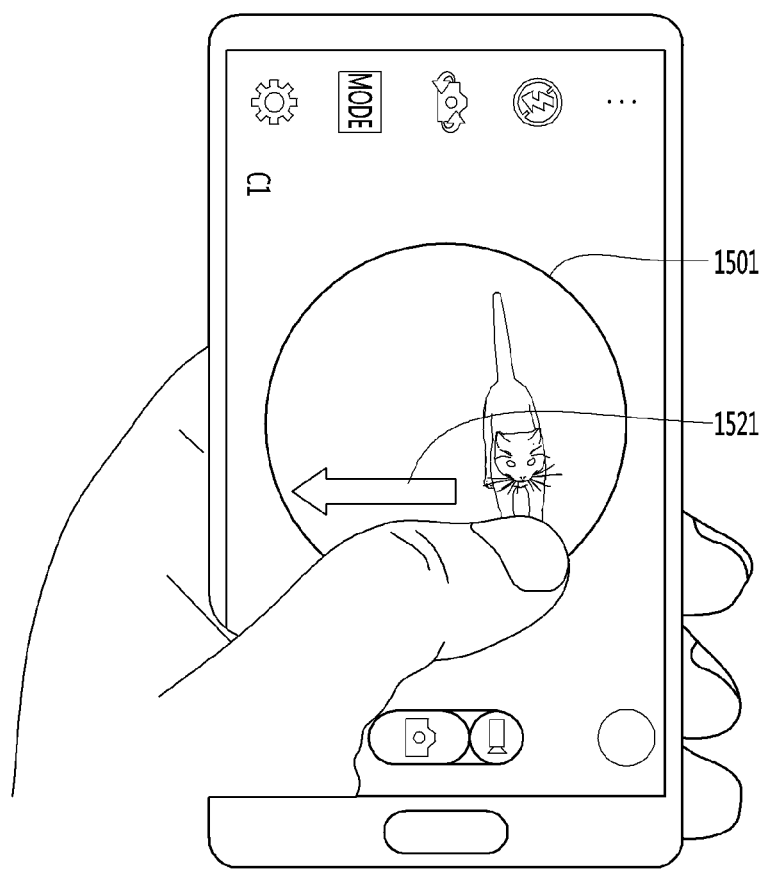

FIGS. 15*a* and 15*b* are diagrams illustrating a method of moving an image when input corresponding to movement is received from a moving image.

Referring to FIGS. 15*a* and 15*b*, the moving image stored in the memory 170 of the mobile terminal 100 is a moving image in which a cat moves to the left.

When the user inputs a gesture 1521 of scrolling to the left after inputting a gesture of selecting the cat 1511 as a moving object in a state in which the moving image 1501 is stopped, the controller 180 of the mobile terminal 100 may play an image in which the cat 1511 moves.

According to the present invention, the user of the mobile terminal may play the moving image in consideration of movement of the object.

Figure 16A:
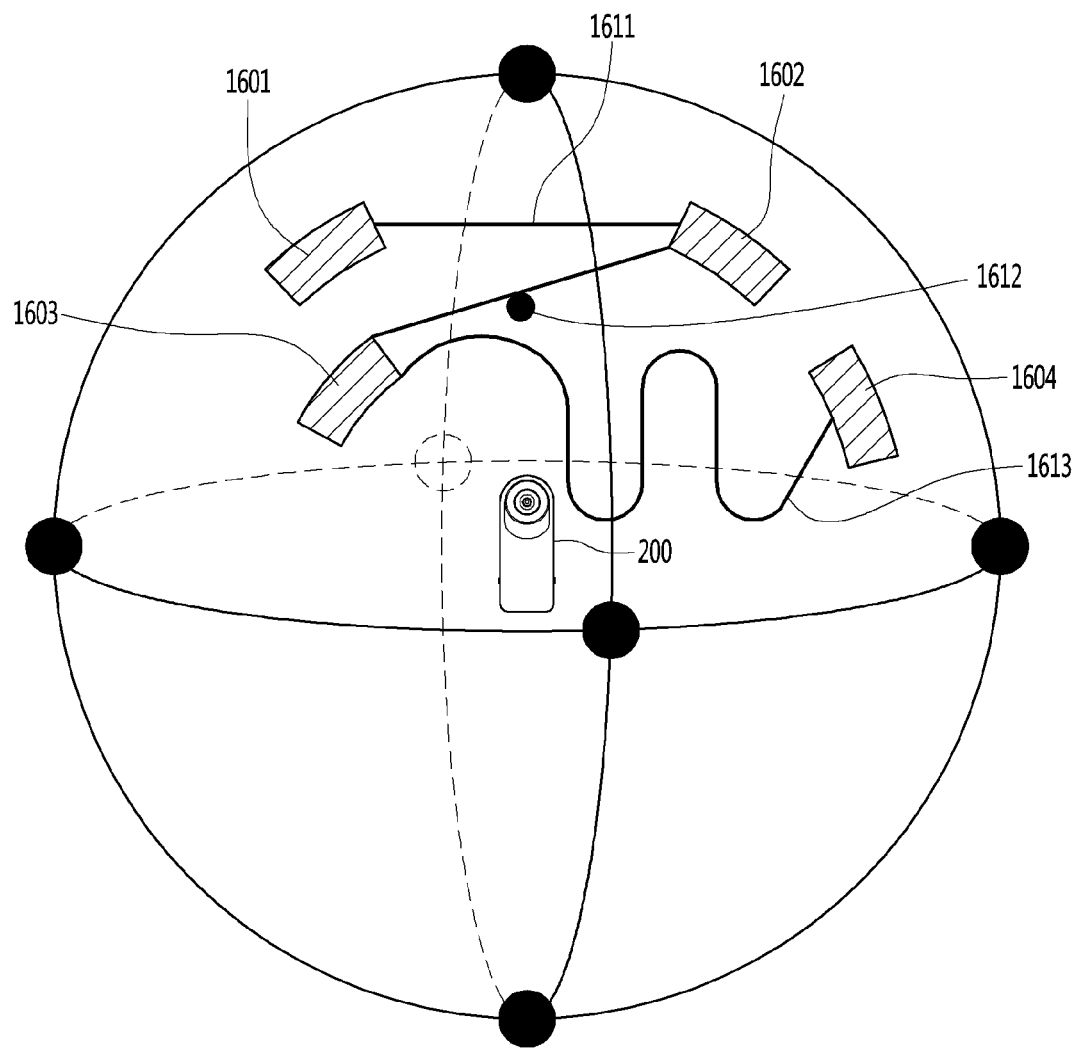
FIGS. 16a and 16b are diagrams illustrating an example of generating a moving image in correspondence with an area, which a user views, of an omnidirectional image.
Figure 16B:
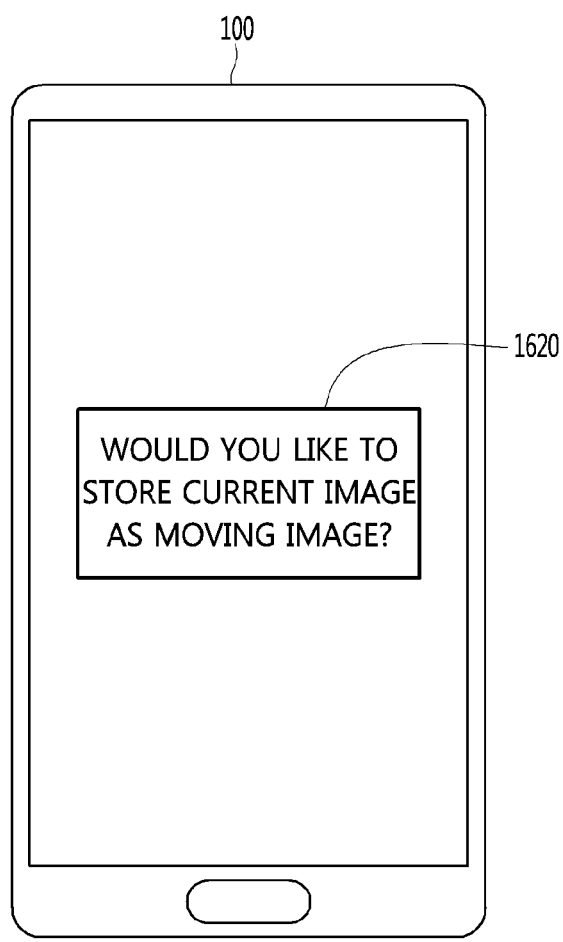

FIGS. 16*a* and 16*b* are diagrams illustrating an example of generating a moving image in correspondence with an area, which a user views, of an omnidirectional image.

In one embodiment of the present invention, when the user of the mobile terminal 100 views the omnidirectional image while moving a point of view, the controller 180 of the mobile terminal 100 may generate a moving image according to the moved point of view.

For example, the user of the mobile terminal 100 may move the point of view of the partial image of the omnidirectional image from a first point of view 1601 to a fourth point of view 1604 through a second point of view 1602 and a point of view 1603. More specifically, the point of view may be moved along a first path 1611, a second path 1612 and a third path 1613. If the point of view of the partial image of the omnidirectional image moves as described above, the controller 180 of the mobile terminal 100 may generate a moving image according to the movement path of the point of view.

In addition, the controller 180 of the mobile terminal 100 may display, on the display unit 151, a notice 1620 indicating that a moving image corresponding to such a path is stored.

According to various embodiments of the present invention, it is possible to acquire a moving image of a moving object from an omnidirectional image.

According to various embodiments of the present invention, it is possible to more easily detect a moving object from an omnidirectional image, from which it is difficult to detect a desired object, and to generate a moving image.

According to various embodiments of the present invention, it is possible to acquire a moving image from an omnidirectional image according to a moving object.

According to various embodiments of the present invention, it is possible to generate a moving image including a moving object and a fixed object near the moving object and to obtain various moving images.

According to various embodiments of the present invention, a mobile terminal may not store an omnidirectional image received from an omnidirectional capture device but may store only a specific capture area. Therefore, it is possible to save storage space of a memory.

On the other hand, the controller 180 is generally a component that manages the control of the apparatus and may also be referred to as a central processing unit, a microprocessor, a processor, and the like.

The present invention mentioned in the foregoing description may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
   a short-range communication module;
   a display unit; and
   a controller operably coupled to the short-range communication module and the display unit, and configured to:
   perform short-range communication with an omnidirectional capture device for capturing an omnidirectional image via the short-range communication module;
   cause the display unit to display the omnidirectional image received through the short-range communication module;
   set a plurality of areas, in which a plurality of moving images are generated, in the omnidirectional image; and
   generate the plurality of moving images respectively corresponding to the plurality of areas,
   wherein each of the plurality of moving images is an animation combining a plurality of images corresponding to each of the plurality of set areas, and
   wherein the plurality of images of each set area is obtained according to a preset frame rate.

2. The mobile terminal according to claim 1, wherein the controller identifies a moving object in the omnidirectional image, and
   wherein a first area of the plurality of set areas in which a plurality of moving images are generated includes the moving object.

3. The mobile terminal according to claim 2, wherein the controller identifies a stopped object located within a predetermined distance from the moving object,
   wherein the first area includes the moving object and the stopped object.

4. The mobile terminal according to claim 2, wherein the controller flexibly changes the first area over time.

5. The mobile terminal according to claim 4, wherein the controller changes the first area over time such that the moving object is located at a predetermined position of the first area.

6. The mobile terminal according to claim 1, wherein the display unit is a touchscreen and the controller receives an input to designate a first area of the plurality of areas, in which the plurality of moving images are generated, through the touchscreen.

7. The mobile terminal according to claim 6, wherein the controller sets an area at a predetermined angle from an input point of the input as the first area.

8. The mobile terminal according to claim 1, wherein the controller receives an input of selecting an object on the display unit for a predetermined time or more,
   wherein a first area of the plurality of areas in which a plurality of moving images are generated includes the selected object.

9. The mobile terminal according to claim 1, wherein, if a predetermined touch input is received on a screen of the display unit, the controller sets the plurality of areas, in which the plurality of moving images are generated, at an angle of 180° therebetween in the omnidirectional image.

10. The mobile terminal according to claim 1, wherein, if a touch input is received on a screen of the display unit n times, the controller sets n areas, in which the plurality of moving images are generated, and sets the n areas at a predetermined angle therebetween in the omnidirectional image.

11. The mobile terminal according to claim 1, further comprising a memory, wherein the animation is generated by causing the memory to store the plurality of images received according to the preset frame rate from the omnidirectional capture device as a single file in a graphics interchange format (GIF).

12. A method of operating a mobile terminal, the method comprising:
performing short-range communication with an omnidirectional capture device for capturing an omnidirectional image and receiving the omnidirectional image from the omnidirectional capture device;
displaying the received omnidirectional image;
setting a plurality of areas, in which a plurality of moving image are generated, in the omnidirectional image; and
generating the plurality of moving images respectively corresponding to the plurality of areas,
wherein each of the plurality of moving images is an animation combining a plurality of images corresponding to each of the plurality of set areas, and
wherein the plurality of images of each set area is obtained according to a preset frame rate.

13. The method according to claim 12, further comprising:
identifying a moving object in the omnidirectional image;
wherein a first area of the plurality of set areas in which a plurality of moving images are generated includes the moving object.

14. The method according to claim 13, further comprising identifying a stopped object located within a predetermined distance from the moving object,
wherein the first area includes the moving object and the stopped object.

15. The method according to claim 13, further comprising flexibly changing the first area over time.

16. The method according to claim 15, wherein the first area is changed over time such that the moving object is located at a predetermined position of the first area.

17. The method according to claim 12, further comprising receiving an input to designate a first area of the plurality of area, in which the plurality of moving images are generated, the input received through a touchscreen display of the mobile terminal.

18. The method according to claim 17, wherein the first area is an area within a predetermined angle from an input point of the input.

19. The method according to claim 12, further comprising receiving an input of selecting an object for a predetermined time or more,
wherein a first area of the plurality of areas in which a plurality of moving images are generated includes the selected object.

20. The method according to claim 12, further comprising:
connecting the plurality of set areas to generate a single moving image.

* * * * *